(12) United States Patent
Skinner et al.

(10) Patent No.: US 10,398,078 B2
(45) Date of Patent: Sep. 3, 2019

(54) PIVOT POSTS AND TRIMMER HEADS UTILIZING THE SAME

(71) Applicant: Shakespeare Company, LLC, Columbia, SC (US)

(72) Inventors: David B. Skinner, Columbia, SC (US); Brian Searfoss, Elgin, SC (US); Wen Liu, Guangshui (CN); Lin Wang, ChangSha (CN); Jack Yang, Shangrao (CN)

(73) Assignee: Shakespeare Company, LLC, Greer, SC (US)

( * ) Notice: Subject to any disclaimer, the term of this patent is extended or adjusted under 35 U.S.C. 154(b) by 310 days.

(21) Appl. No.: 15/127,488

(22) PCT Filed: Mar. 20, 2015

(86) PCT No.: PCT/US2015/021694
§ 371 (c)(1),
(2) Date: Sep. 20, 2016

(87) PCT Pub. No.: WO2015/143288
PCT Pub. Date: Sep. 24, 2015

(65) Prior Publication Data
US 2017/0172063 A1 Jun. 22, 2017

Related U.S. Application Data

(60) Provisional application No. 61/955,949, filed on Mar. 20, 2014, provisional application No. 61/989,561, (Continued)

(51) Int. Cl.
*A01D 34/416* (2006.01)

(52) U.S. Cl.
CPC ................ *A01D 34/4166* (2013.01)

(58) Field of Classification Search
CPC ............. A01D 34/416; A01D 34/4161; A01D 34/4166; A01D 34/4167; A01D 34/4168
(Continued)

(56) References Cited

U.S. PATENT DOCUMENTS

D358,535 S    5/1995  Skinner
6,052,974 A   4/2000  Harb
(Continued)

*Primary Examiner* — Jennifer B Swinney
*Assistant Examiner* — Richard D Crosby, Jr.
(74) *Attorney, Agent, or Firm* — Eversheds Sutherland (US) LLP

(57) ABSTRACT

A trimmer head having at least two pivoting line holders for holding multiple folded strips of trimming line is presented wherein said pivoting line holders are retained within said housing between said housing and said cover and extend upward through apertures in said cover, said line holders being capable of movement around a vertical axis of rotation, at least three embodiments are disclosed which provide a rounded landing for supporting the inner radius of a folded strip of trimming line, the rounded geometry of the landing prevents line stress and breakage, the various embodiments include a pivot post having two parallel straight through holes with a rounded vertical wall between the through holes, a single open passageway having a center metal post, and a single open passageway having a series of at least two metal pins through the center of the passageway.

2 Claims, 35 Drawing Sheets

Related U.S. Application Data filed on May 7, 2014, provisional application No. 62/000,177, filed on May 19, 2014.

(58) Field of Classification Search
USPC .......................................................... 30/276
See application file for complete search history.

(56) References Cited

U.S. PATENT DOCUMENTS

| | | | |
|---|---|---|---|
| 6,519,857 B1* | 2/2003 | Proulx | A01D 34/416 30/276 |
| 6,944,956 B1* | 9/2005 | Fogle | A01D 34/4166 30/276 |
| 7,257,898 B2* | 8/2007 | Iacona | A01D 34/416 30/276 |
| 7,603,782 B2 | 10/2009 | Jerez | |
| 7,743,511 B2 | 6/2010 | Jerez | |
| 2008/0034724 A1 | 2/2008 | Jerez | |
| 2009/0031567 A1* | 2/2009 | Fogle | A01D 34/416 30/276 |
| 2009/0038163 A1 | 2/2009 | Jerez et al. | |
| 2012/0066915 A1 | 3/2012 | Alliss | |
| 2012/0246945 A1 | 10/2012 | Harless et al. | |
| 2015/0289446 A1* | 10/2015 | Duvall | A01D 34/4166 30/276 |
| 2015/0351319 A1* | 12/2015 | Skinner | A01D 34/4166 30/276 |
| 2017/0172063 A1* | 6/2017 | Skinner | A01D 34/4166 |
| 2017/0303468 A1* | 10/2017 | Nolin | A01D 34/416 |

* cited by examiner

PIVOT POSTS AND TRIMMER HEADS UTILIZING THE SAME

CROSS-REFERENCE TO RELATED APPLICATIONS

This application is a U.S. National Phase Application of International Application PCT Application No. PCT/US2015/021694 filed on Mar. 20, 2015, which claims the benefit of priority from U.S. Provisional Patent Application No. 61/955,949, filed Mar. 20, 2014; U.S. Provisional Patent Application No. 61/989,561, filed May 7, 2014; and U.S. Provisional Patent Application No. 62/000,177, filed May 19, 2014, all of which are incorporated by reference as if fully rewritten herein.

FIELD OF THE INVENTION

The present invention relates to trimmer heads for rotary trimmers using monofilament as a means for cutting vegetation; and, more specifically it relates to trimmer heads with an improved means to hold folded strips of trimmer line, the means being capable of pivoting to minimize line breakage upon impact with solid objects and dense vegetation.

BACKGROUND OF THE INVENTION

There are many names commonly used interchangeably for the monofilament line used for cutting vegetation, including not limited to the following: trimmer line, weed trimmer line, grass trimmer line, monofilament line, string trimmer line, strimmer line, cutting line, line, line strips, strips, flails, and weed whacker line. Monofilament line is sold in many different cross-sectional shapes and is made from many different types of nylon plastic. Some of the nylon plastics are more easily deformed than others and some materials have lower melting points than others.

The prior art, including U.S. Pat. Nos. 7,603,782 and 7,743,511 (hereby included by reference for their teachings), discloses trimmer heads with line holding mechanisms (line holders) capable of pivoting on a vertical axis. Names commonly used for these line holders includes but is not limited to: posts, pivoting line holders, pivoting posts, pivot posts, line holding mechanisms and pivoting line holding mechanisms. All of these terms many be used interchangeably. These terms are used with line holders designed to pivot about a vertical axis. Some of these terms, however, are also used with line holders that are not designed to pivot.

The prior art discloses various designs for line holders, including line holders having a series of at least two, spaced but adjacent, parallel holes extending from end-to-end completely through the line holder, with the material between the two holes serving as a central member about which a bent back, flexible trimming line is positionable with the central crook of the bent-back line being wrappable around the central member and with the rest of the line segments positionable in and extending completely through the openings with the distal ends of the flexible trimming line extending out of and past the line holders.

Certain commercialized products incorporating pivoting posts include line-holding mechanisms having the basic shape of a round post with a circular flange at the lower end. The top end of the post is beveled (slanted) on two opposite sides with two straight-through passageways for insertion of the trimmer line, where the passageways connect the two beveled portions. The flange at the bottom of the post is sandwiched between a lower cover and the upper portion of the head and is held such that it can rotate about a central vertical axis but cannot be moved in a vertical manner. The pivot posts on commercial trimmer heads are injection molded as a single piece of plastic and have two parallel straight through holes with a portion of plastic separating the two through holes. A representation of these prior art commercial pivot posts can be found as reference numeral 50 in FIG. 19 of the '511 patent.

To load trimmer line in the posts of the prior art trimmer head, two opposed ends of a folded strip of line are threaded through the two straight parallel holes from a first side and the central folded portion of line is pulled tightly against the portion of plastic separating the two holes. Commercial trimmer heads utilizing this type of pivoting line holding mechanism can have two, three or four pivoting posts and include the PivoTrim™ X2, PivoTrim™ Ugly™ Head, and the PivoTrim™ Classic and PivoTrim™ Pro models, respectively. These products are sold by Shakespeare Company, LLC.

During use, the trimmer head is rotated by a string trimmer or brush cutter machine. With pivoting post trimmer heads, the ends of each folded piece of trimmer line will extend out radially due to the centrifugal force created by the rotation of the trimmer head. The tips of the trimmer line are able to cut vegetation due to its rotational velocity. If the trimmer line impacts an immovable object or very dense vegetation, the line and post can pivot away from the point of impact, which reduces the stress on the trimmer line. An advantage touted for trimmer heads with pivoting line holders is that the trimmer line is less apt to break if it impacts a fence or other immovable object. There are some shortcomings associated with the commercial designs of the pivoting post heads, however.

Over time, the trimmer line becomes worn and must be replaced. At that point, the folded strips must be removed and new strips inserted. Consumers sometimes report needing to use a pair of needle-nose pliers to pinch the folded portion of the line to remove the remaining U-shaped portion of trimmer line from the post. If the consumer does not have a tool that can grip the line, then they must stop using the trimmer head until a tool can be obtained to remove the lines. This is frustrating to the consumer.

Additionally, over time the portion of plastic separating the two straight through holes can become worn at the two opposite ends. This can occur due to a slight sawing motion that occurs when certain lines are used in the pivoting posts. If the consumer selects a trimmer line that is not held tightly by the post, it is possible for one of the two ends of trimmer line to be gripped more than the other upon impact, pulling on one leg of the line and making it shift through the two passageways of the post. The line shifting acts like a saw on the portion of the post separating the two through holes. Over time, this sawing motion can create a recessed area where the line can be pulled further into the body of the pivot post, making removal of the line even more difficult. The portion of plastic separating the two through holes continues to wear more and more over time and the post must eventually be replaced.

The above discussed sawing motion can also cause frictional melting of either the trimmer line surface or the surface of the portion of the plastic pivot post separating the two through passageways. Once the motion of the trimmer head stops, the melted portion cools, and the plastic line and plastic pivot post fuse together. This can make removal of the used portion of the line very difficult, even when using needle nosed pliers to grip the line remnant.

Another observation is that when the strip of trimmer line is folded, the portion of line at the fold will flare or bulge outward and perpendicular to the plane containing the folded line. The amount of flare varies with the shape and design of the particular trimmer line used. During use, the ends of the trimmer line are pulled with each impact, pulling the folded portion of line more tightly against the portion of the post separating the two through passageways. Thus, the trimmer line becomes more deformed at the fold and the flare becomes accentuated. If the sawing motion discussed above is also taking place, then the deformation associated with the flaring can be pulled towards and wedged into one of the two through holes in the post.

Another complaint is that the two legs of the trimmer line break flush with a slanted surface of the pivot post, leaving the folded portion of line still in place in the post and the short legs of line still inside the two parallel through holes. These short pieces can be difficult to remove. An investigation into scenarios where this is most likely to occur led to identifying the trimming of volunteers (small spouting trees, one to three feet tall) as a trimming application where the line is most apt to break flush with the post. It is thought that the trimmer line wraps around the trunk of the volunteer, thus interfering with the ability of the line to pivot out of the way.

SUMMARY OF THE INVENTION

The proposed invention improves the design of pivot posts for holding strips of folded line in trimmer heads. The novel posts of the present invention are the type that can be held in a trimmer head by sandwiching a lower flange of the pivot post between a lower portion and an upper portion of the trimmer head.

The improved post designs are intended to pivot about the post's central vertical axis. A first embodiment of the improved post designs can be molded from 100% plastic and takes advantage of improved geometry to prevent the flared portion of trimmer line from becoming wedged in either of the two passageways. A second embodiment of the post design utilizes the combination of plastic and metal components in a new geometry to create a post that is mainly plastic with metal incorporated in the central vertical axis to minimize wear and fusion between the post and the line. A third embodiment of the post design eliminates the two parallel passageways known in the prior art. These two parallel passageways are replaced with a single channel or passageway. One or more metal pins are used external to the channel to retain the folded portion of the line. This novel post design has more room within its single channel which makes the design more forgiving of deformed segments of trimmer line that might get pulled into the channel. Additional post designs are within the scope of the present invention that include variations of the above concepts.

One of the objectives of the present invention is to provide a novel, improved design for pivoting line holding mechanisms where the pivoting posts are designed to hold a folded strip of line.

Another objective of the present invention is to provide pivot post designs having improved geometric shapes that greatly minimize or eliminate breakage of the trimmer line at the exit of the through holes.

Another objective is to provide pivot post designs having improved geometric shapes where the portion of the line that is folded is less apt to wedge into a line passageway in the pivot post.

Another objective is to provide pivot post designs with improved geometric shapes and better material selections that make removal of used strips of folded monofilament easier without the use of tools.

Another objective is to provide pivot post designs that combine plastic with metal to substantially eliminate wear on the portion of the post that holds the folded strip of line.

Another objective is to provide pivot post designs with geometric shapes that reduce the weight of the post.

Another objective of this invention is to provide improved trimmer heads utilizing the above improved pivoting line-holding posts, the new trimmer heads greatly reducing consumer frustration relative to commercial trimmer heads.

Another objective of this invention is to provide improved trimmer heads utilizing three posts equally spaced 120° degrees apart, the posts being improved based upon the objectives discussed above, the new trimmer heads greatly reducing consumer frustration and being suitable for a wide range to trimmer machines.

Another objective is to provide improved trimmer heads based upon improved pivot post designs, those designs being able to function with a wide variety of line shapes and line materials without causing frustration for the consumer.

DETAILED DESCRIPTION

Figure 1:
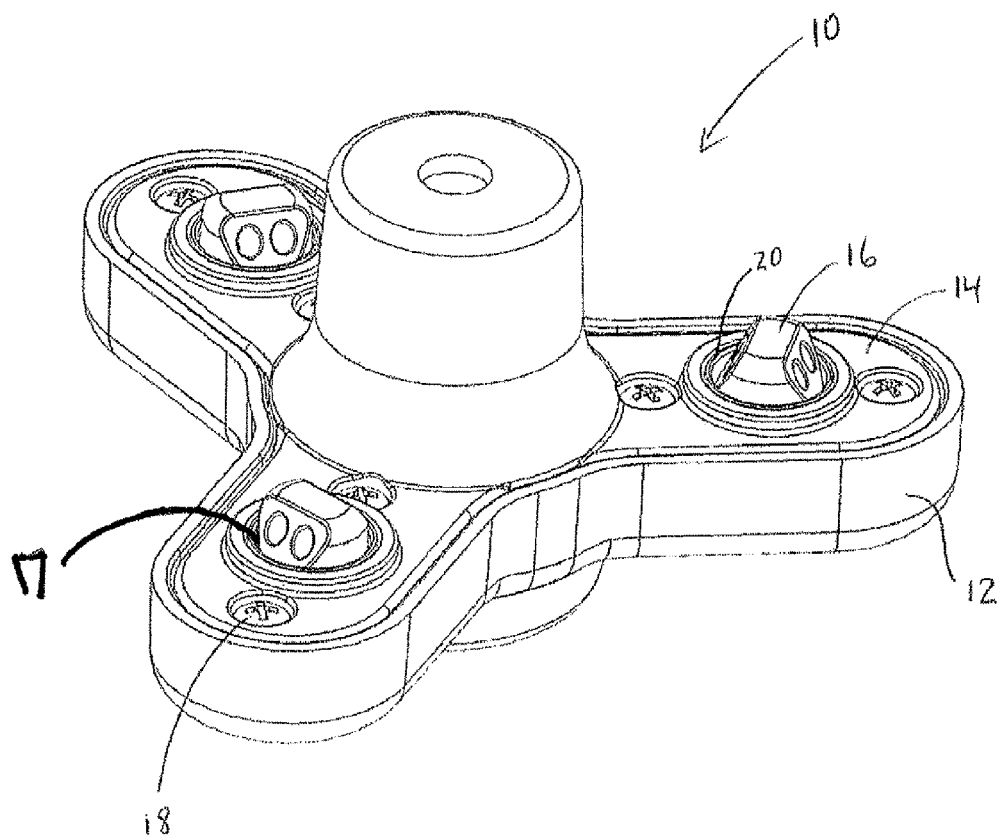
FIG. 1 shows a trimmer head representative of the prior art, specifically, an upper perspective view of the Ugly™ Head commercialized by Shakespeare Company, LLC.
Figure 2:
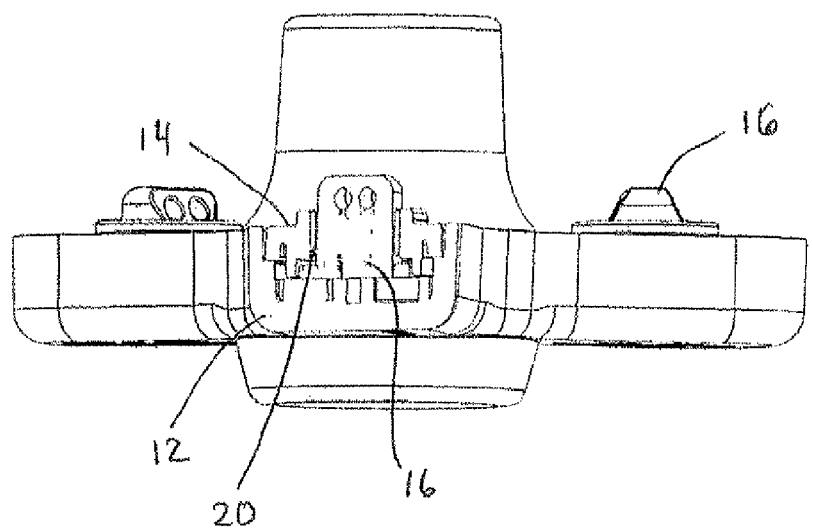
FIG. 2 shows a cutaway view through one of the pivot posts of the prior art head shown in FIG. 1.
Figure 3:
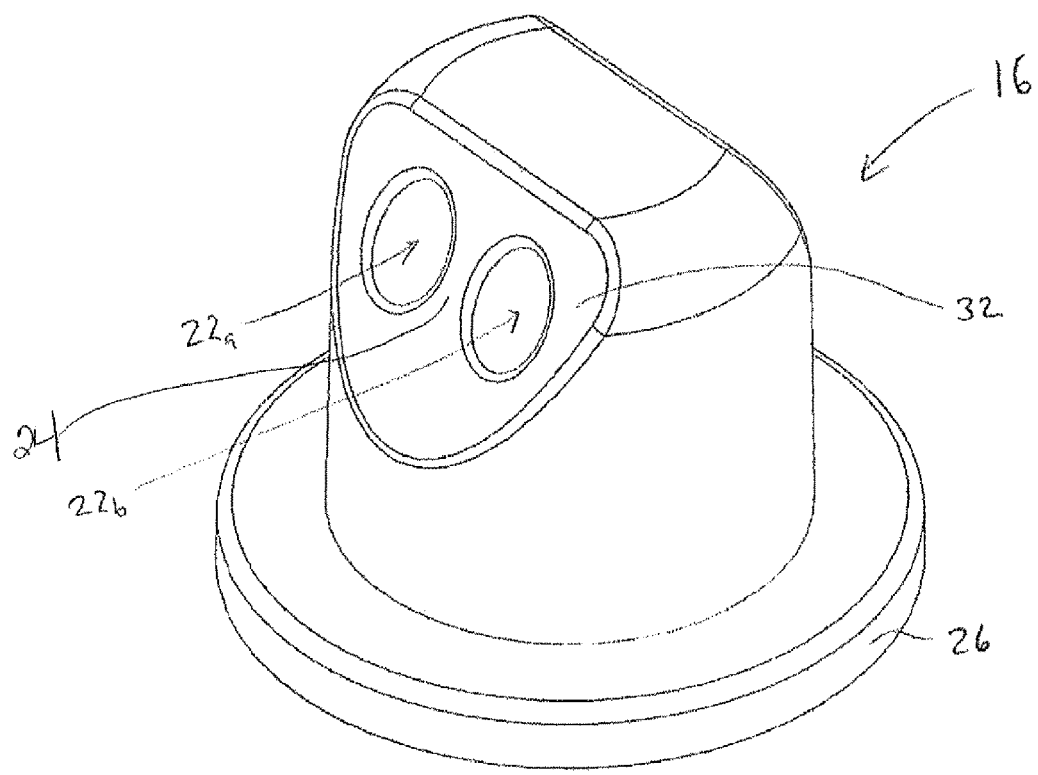
FIG. 3 shows an upper perspective view of one of the three pivot posts of the prior art head shown in FIG. 1.
Figure 4:
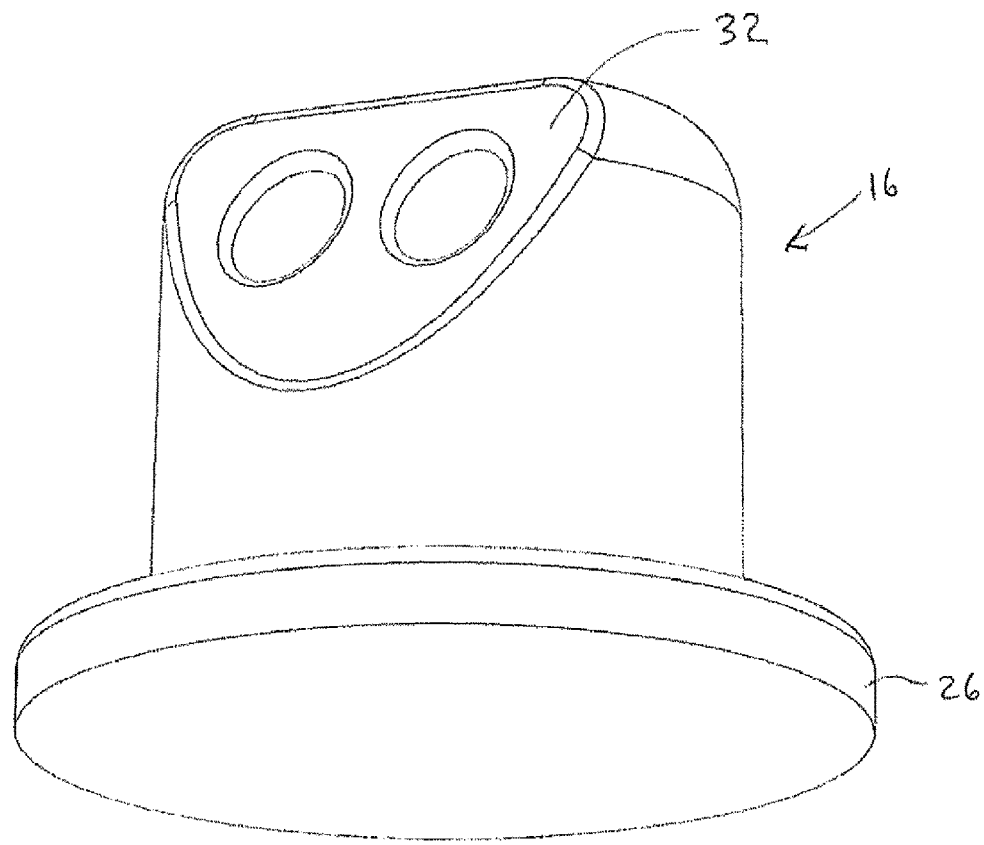
FIG. 4 shows a lower perspective view of the prior art pivot post shown in FIG. 3.
Figure 5:
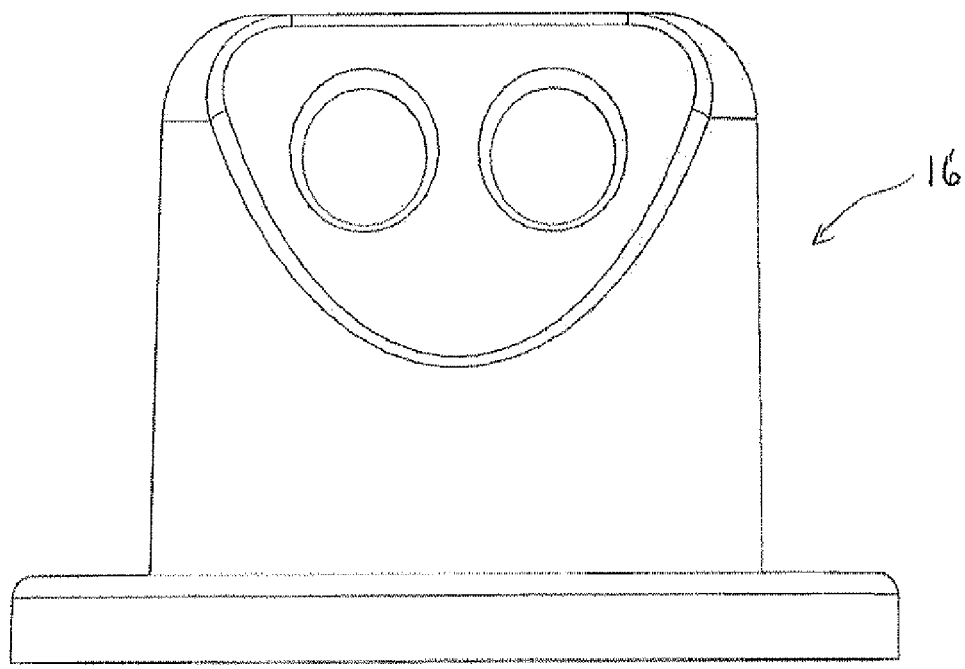
FIG. 5 shows a side view of the prior art pivot post shown in FIG. 3.
Figure 6:
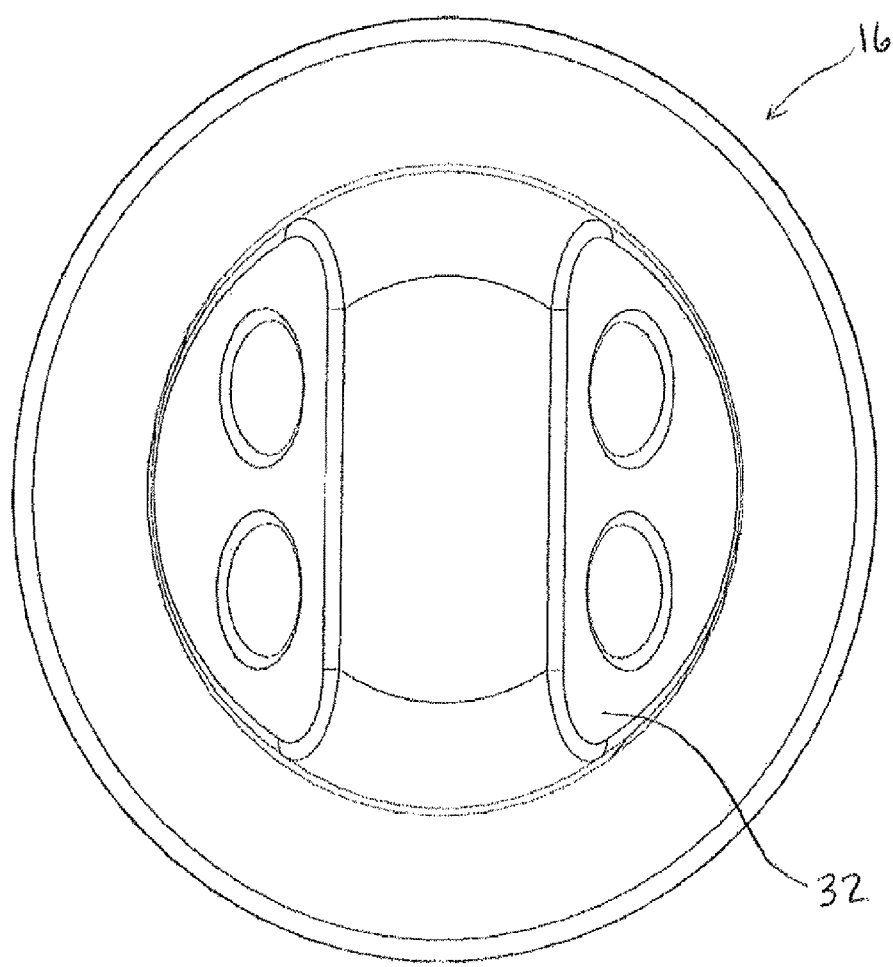
FIG. 6 shows a top view of the prior art pivot post shown in FIG. 3.
Figure 7:
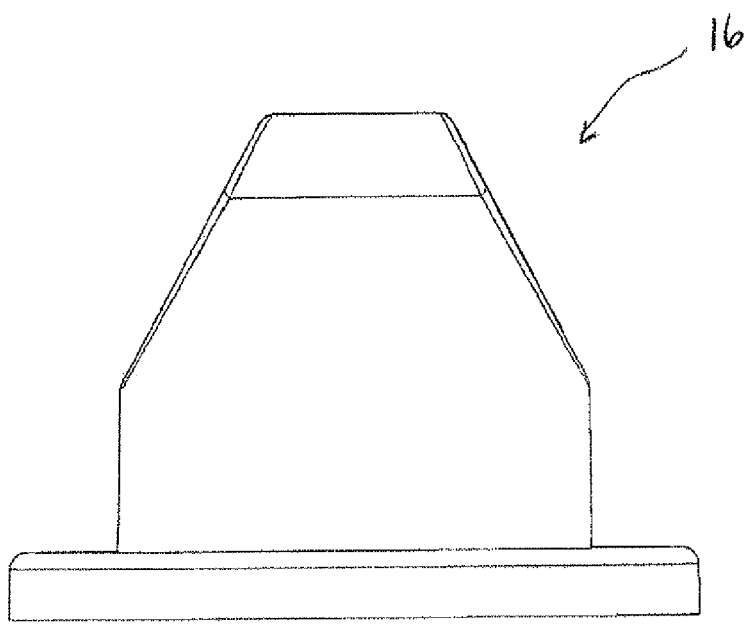
FIG. 7 shows an alternate side view of the prior art pivot post shown in FIG. 3.
Figure 8:
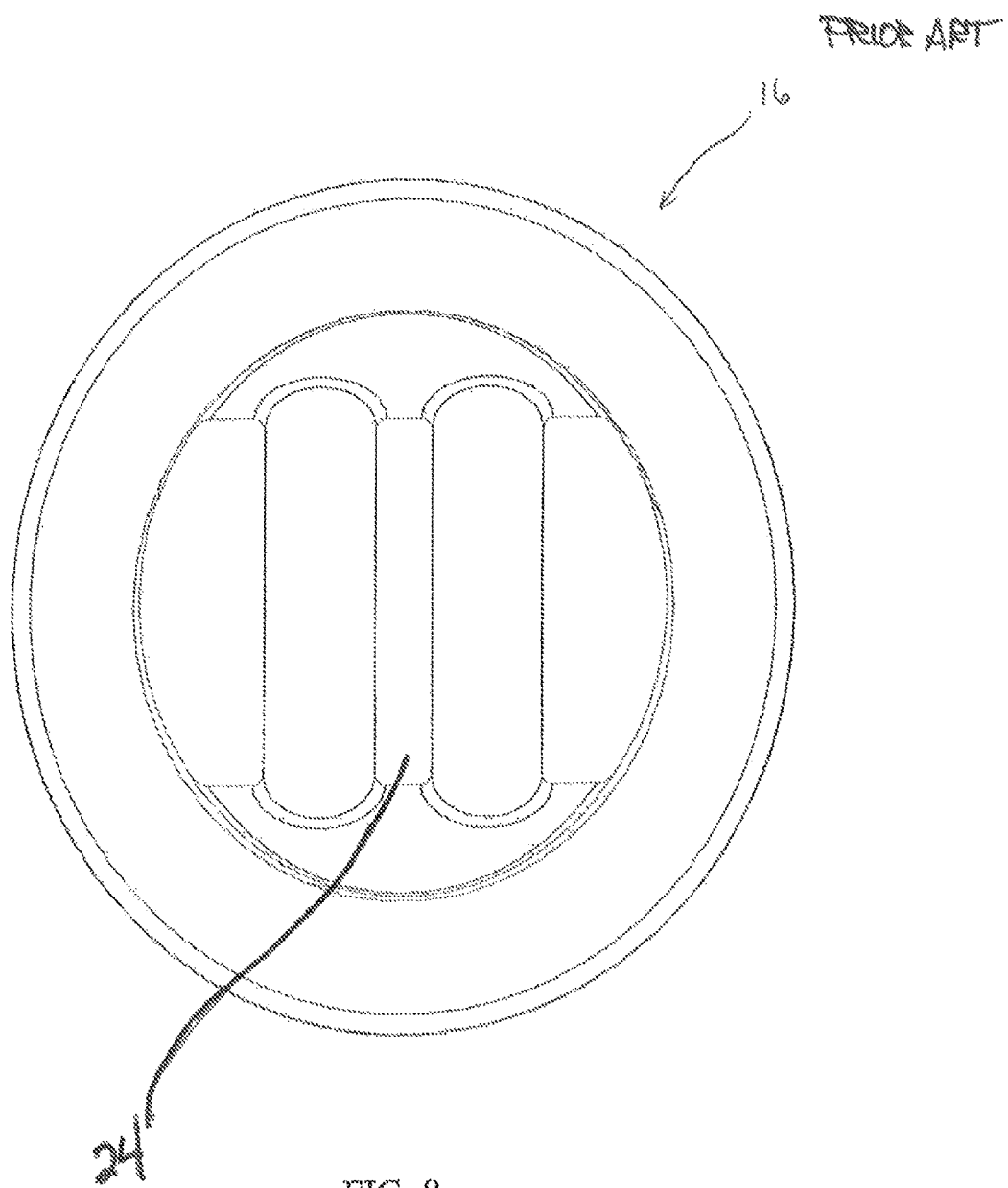
FIG. 8 shows a cutaway top view of the prior art pivot post shown in FIG. 3, the horizontal slice taken through the centerline of the two through holes.

The Ugly™ Head model trimmer head sold by Shakespeare Company, LLC is shown in FIG. 1. The trimmer head consists of a main housing 12 and a cover 14 which are held together by six screws 18. The cover 14 has three apertures 17 which the pivot posts extend upward through. One metal ring 20 is press fit into each of the three apertures. The metal rings 20 act as bearing sleeves for the rotation of the pivot posts within the apertures 17. As shown in FIG. 2, a pivot post 16 is constrained between the main housing and the cover, and protrudes through each of the three apertures. The pivot posts 16 can rotate about a central vertical axis, but cannot move vertically and are constrained in all other directions by the bearing sleeves 20.

The prior art pivot posts 16 are shown in FIGS. 3-8. Each pivot post 16 has two parallel straight-through holes 22a & 22b for holding a folded strip of trimmer line. The pivot posts are molded as a single piece of plastic, typically glass-filled nylon, with a portion of plastic material 24 separating the two holes along their entire length, end-to-end (see FIGS. 3 and 8). There is a slanted surface 32 which extends from the top of the post to the side, approximately mid-way down the height of the post. This slanted surface 32 slices through the two parallel straight-though holes at the ends of the holes to create a more tapered shape.

The posts also have a lower flange 26 which is constrained between the main housing 12 and the cover 14, which prevents the post from moving vertically. The spacing between the main housing, cover and the bearing sleeves allows the pivot posts to freely rotate about a central vertical axis.

The Ugly™ Head trimmer head model has three portions or legs, each leg supporting one pivoting post. There are other commercially available trimmer heads which are round and which are designed to have two, three or four pivoting posts. With all of these products, the pivoting posts are designed as shown in FIGS. 3 through 8 and the lower flange 26 is contained between the housing and cover of the trimmer head.

Figure 35:
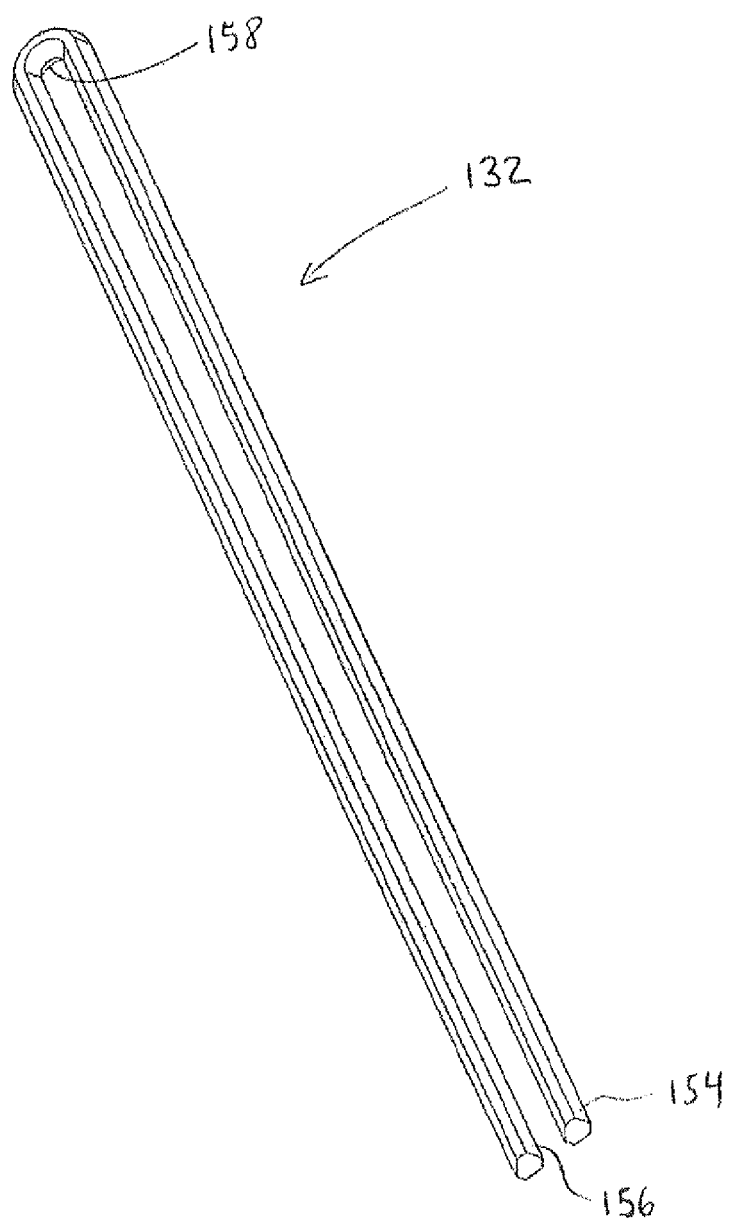
FIG. 35 depicts a piece of folded trimmer line that would be used in the embodiments disclosed in this specification.

The Ugly™ Head trimmer head model and the following embodiments of the present invention are all designed to hold a folded strip of trimmer line. A folded strip of line is depicted in FIG. 35. The line has two distal ends 154 and 156. The inside radius of the folded strip is labeled 158 in FIG. 35. This is the portion of the line strip that is restrained in the following examples.

First Embodiment of the Present Invention

An improved pivot post design is shown in FIGS. 9-13. The improved pivot post 116 can replace the pivot posts 16 shown in FIG. 1 without modification of the remaining structure of the Ugly™ Head trimmer head model. The thickness and diameter of the lower flange 126 can be identical to that of lower flange 26 on the prior art pivot post 16. As such, improved pivot post 116 can be switched in for prior art pivot post 16 in virtually any model of trimmer head without changing the existing structure of the trimmer head. The overall heights of the pivot post 16 of the prior art and of the pivot post 116 of this invention can also easily be the same. The pivot post of the present invention 116 can be used in any of the existing commercial Shakespeare heads without modification of the heads.

Figure 9:
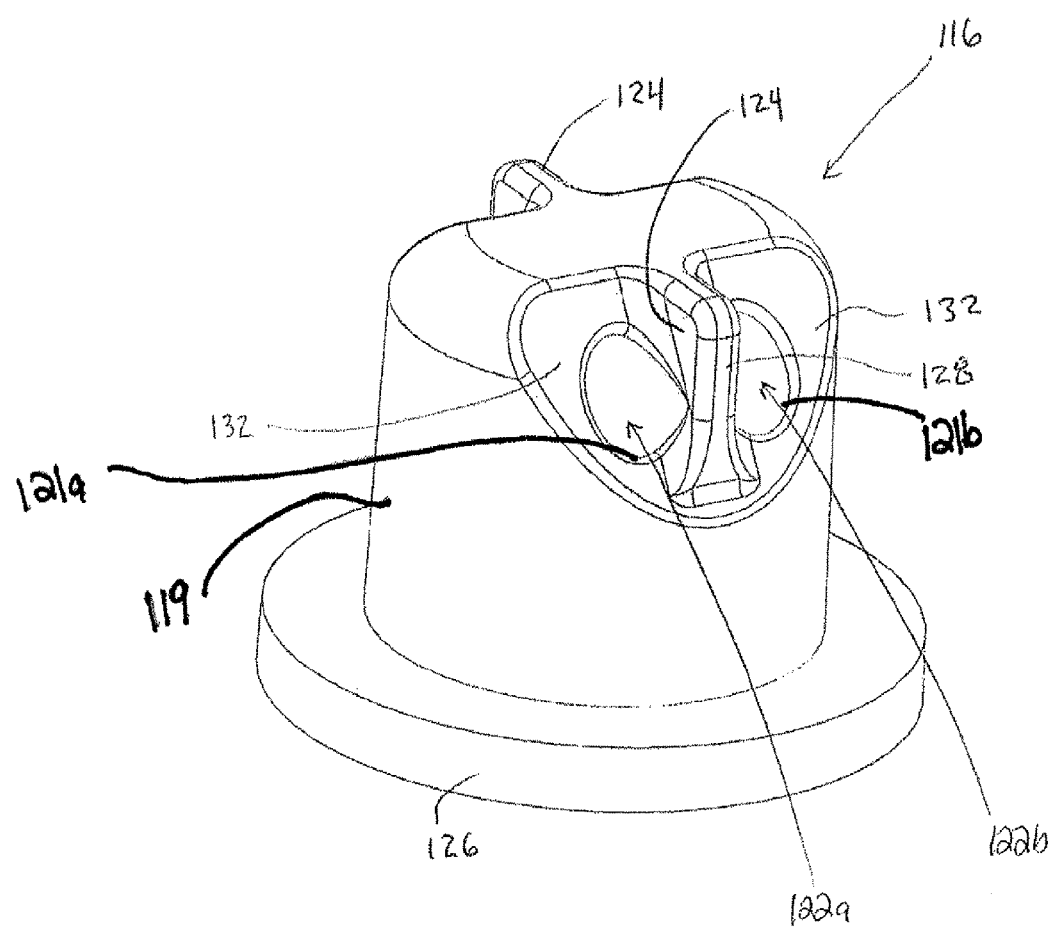
FIG. 9 shows an upper perspective view of a first embodiment of an improved pivot post of the present invention.
Figure 10:
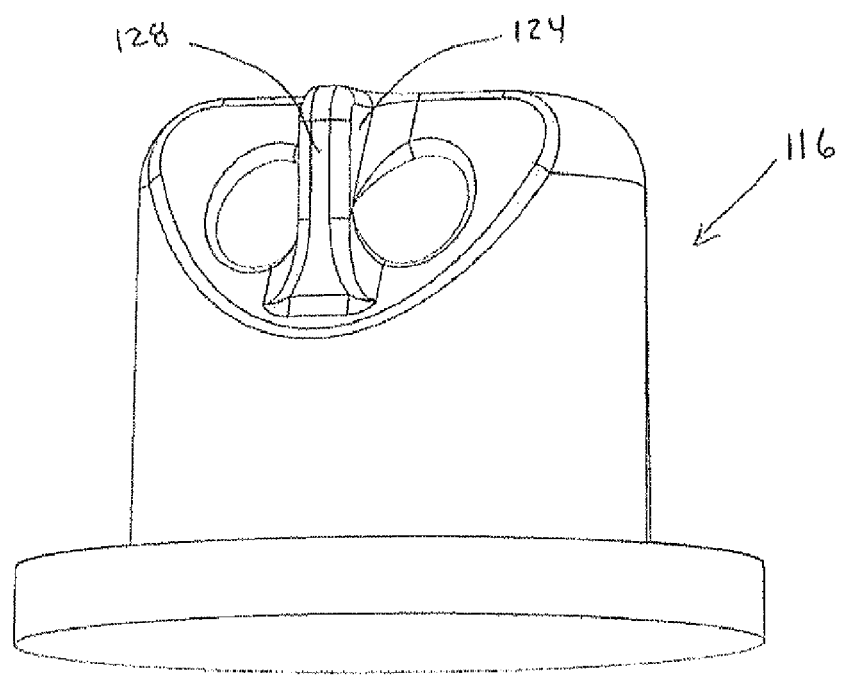
FIG. 10 shows a lower perspective view of the pivot post shown in FIG. 9.
Figure 11:
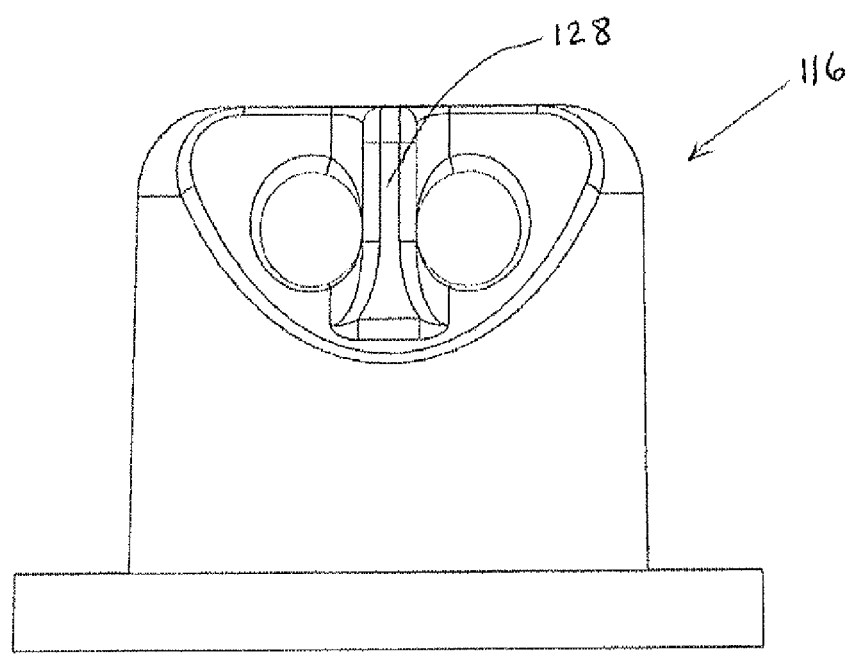
FIG. 11 shows a side view of the pivot post shown in FIG. 9.

The improved pivot post 116 comprises a generally cylindrical main housing portion 119 and a lower flange 126. The main housing portion 119 comprises two parallel straight through holes 122a and 122b. The exits 121a-d on both ends of these two straight-through passageways are predominately defined by the slanted (beveled) surface 132. However, the portion of plastic 124 separating these two holes along their entire length has been extended beyond the slanted surface 132, almost the full diameter of the pivot post. As can be seen in FIG. 9, the portion of plastic 124 separating the passageways extends generally to the outer perimeter of pivot post. This extended portion of plastic separating the two through holes has a vertical wall portion 128. When a folded piece of trimmer line 132 (shown in FIG. 35) is inserted into the pivot post 116, the inside radius 158 of the folded line is placed against this vertical wall portion 128. The vertical wall 128 has a generous radius 130 on the outside edge against which the trimmer line will press during use.

Figure 12:
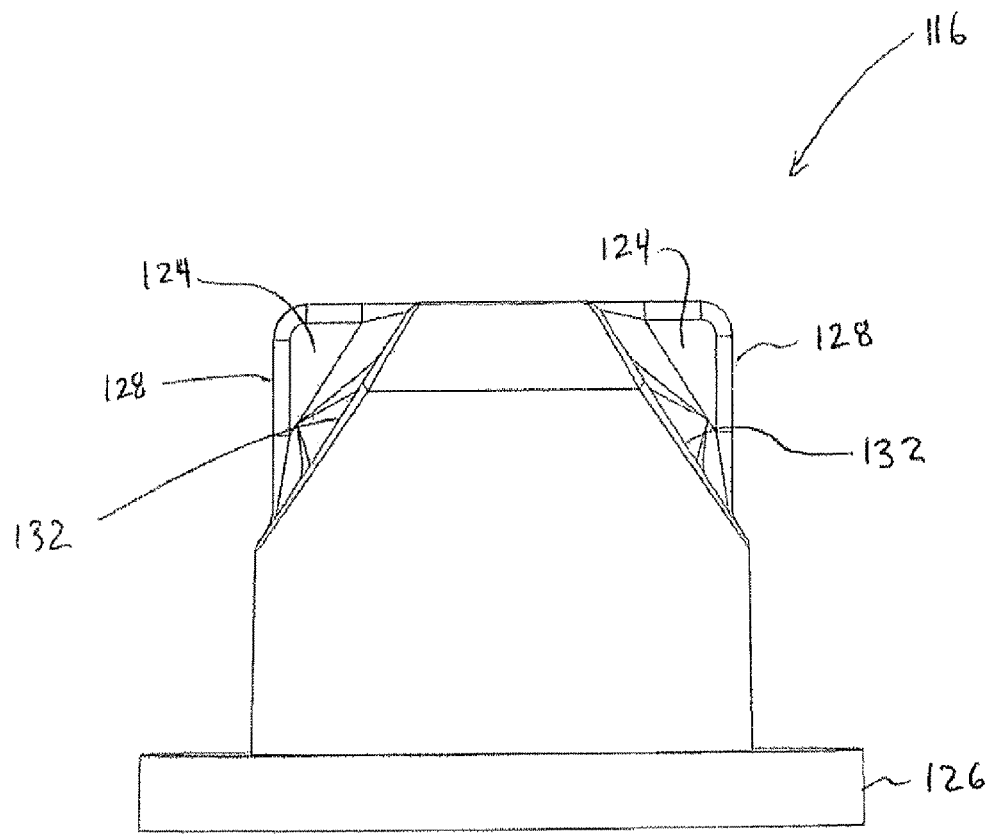
FIG. 12 show an alternate side view of the pivot post shown in FIG. 9.
Figure 13:
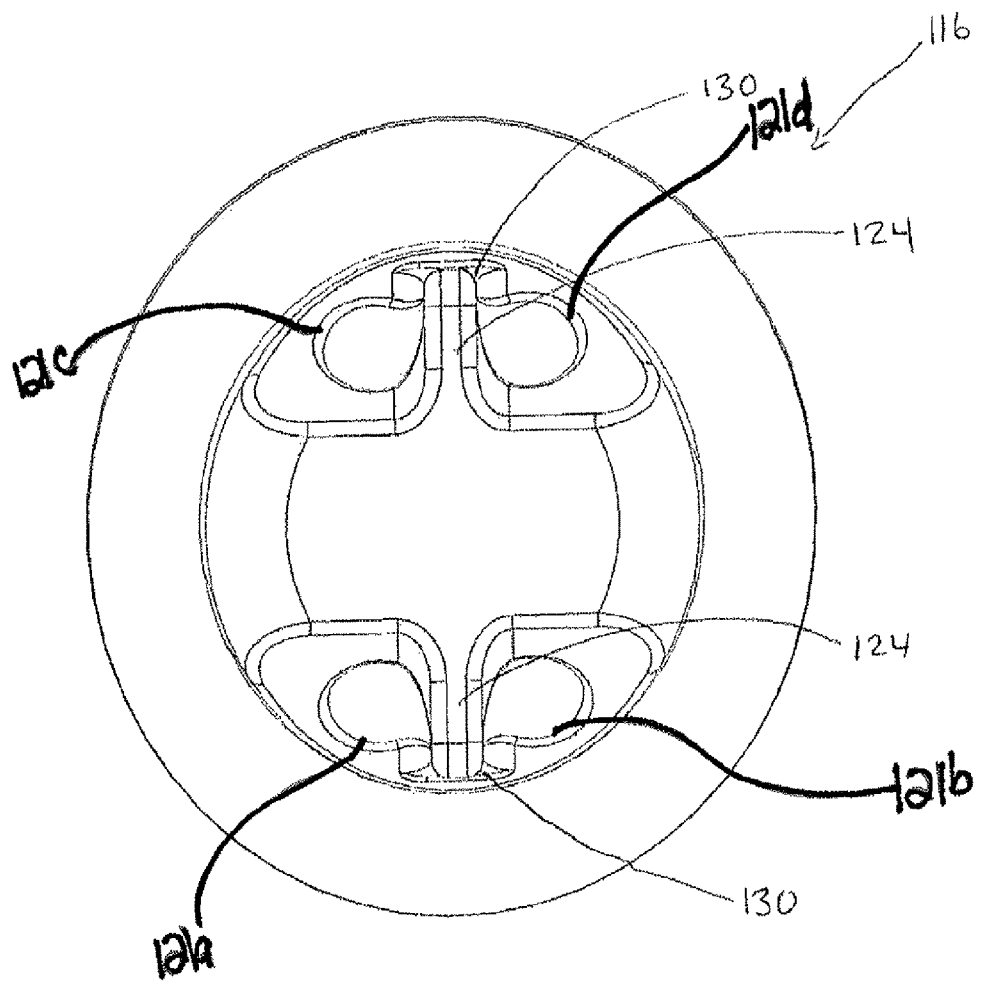
FIG. 13 shows a top view of the pivot post shown in FIG. 9.

This pivot post design provides constant spacing between the vertical wall 128 and the slanted surface 132, as shown in FIGS. 9 and 12. This constant spacing, even under centrifugal forces during use of the trimmer head, improves the ease of removal the trimmer line after use. Trimmer line tends to distort by flaring or bulging when bent. This constant spacing prevents the distorted trimmer line from entering the straight through holes 122a and 122b if the line is pulled back and forth in a sawing motion.

The shape of the new pivot post 116 is also unique in that a longer portion of the trimmer line is supported by the pivot post. The trimmer line is supported and retained across the length of the straight through holes plus the length of the constant spacing (e.g. the vertical wall) on one side of the post. Additionally, one of the two legs of the trimmer line is supported by the length of the vertical wall located on the side opposite the location of the trimmer line fold. For pivot post 116 shown in FIG. 9, the trimmer line is supported a distance of up to 14.5 mm. The prior art pivot post 16 used in the Ugly™ Head trimmer head model only supported the line a distance of 10 mm. This extra 40 to 45% in length allows the trimmer line to better engage and spin the pivot post when the line is impacted. The advantage is that the motion of the trimmer line will be better able to spin the post, which minimizes acute flexing of the line at the exit of the line passageways.

The performance of the new pivot post 116 was evaluated compared to the prior art post 16 by placing one of the new pivot posts 116 into the Ugly™ head shown in FIG. 1. The second post utilized was the prior art post 16. A third post design was placed in the third leg of the Ugly™ Head trimmer head model, but the data for this third post is not relevant for the present invention. The head was mounted onto an Echo model 266 trimmer which is a straight shaft gas trimmer. For the following examples, the same 95 mil trimmer line was used in all three posts. Although for trial purposes, the trimmer line had a cross-sectional shape defined by U.S. Design Patent D358535, the line cross-section could be any shape commercially available.

Trial #1

The Ugly™ Head trimmer head model was used for trimming 140 feet of dense ground cover, one foot tall. None of the three lines broke. The testing was continued by cutting volunteers (small tree saplings 1-3 feet tall). One of the two legs of trimmer line extending from the commercial post 16 broke flush with the slanted surfaced 32.

The folded strip of line used in the novel post 116 was intact and showed no signs of breakage or fracturing. The trimmer line was easily removed from the novel post 116.

Trial #2

All three folded strips of trimmer line were replaced and another experiment conducted. The head was used for trimming small tree saplings and ivy (vines). These two types of vegetation are unique in that the trimmer line can become wrapped around the vegetation during use. Both legs of trimmer line extending from the commercial post 16 broke flush with the slanted surface 32; the breakage did not occur where the folded portion of line rested, but at the exit holes 23 on the opposite side of the pivot post. However, the folded strip of line used in the invention 116 was intact and showed no signed of breakage, and it was easily removed.

Trial #3

Again, all three folded strips of trimmer line were replaced. The head was used for trimming small tree saplings and ivy (vines). Both legs of trimmer line extending from the commercial post 16 broke flush with the exit holes of the straight through holes (passageways) 22a and 22b. This left a short piece of U-shaped line lodged in the pivot post 16. The short piece of broken line was difficult to remove from the post 16. The folded strip of trimmer line used in the invention 116 was again intact and showed no sign of breakage; and, it was easily removed and then reinserted.

Trial #4

The line for the prior art post 16 was replaced, but the piece of line in the novel post 116 of the present invention was not replaced. The new line in the commercial post 16 was trimmed (shortened) slightly so that this line was the same length as the line in the invention 116. Again, the trimmer head was used for cutting tree saplings and ivy.

Again, both legs of the trimmer line extending from the commercial post 16 broke flush with the exit of the straight through holes 22 leaving a short piece of U-shaped line lodged in the prior art post 16. The short piece of line was difficult to remove. The folded strip of trimmer line used in the invention 116 was again intact and showed no signs of breakage or cracking, and was easily removed and then reinserted.

Trial #5

The trimmer line used with the commercial post 16 was replaced a third time. Again, the piece of trimmer line in the pivot posts of the present invention 116 was not replaced. The new line in the commercial post 16 was trimmed slightly so that the lines from both posts 16 and 116 were the same length. Again, the trimmer head was used for cutting tree saplings and ivy. This time one of legs of the trimmer line extending from the prior art post 16 broke flush with the exit of one of the straight through holes 22. The operation of the trimmer was continued and then the remaining portion of trimmer line was pulled out of the pivot post 16. However, the folded strip of trimmer line used in the present invention 116 was intact and showed no signed of breakage and was easily removed.

In summary, for trials #3-5 collectively, three consecutive pieces of trimmer line were used in the prior art post 16 and broke. Conversely, given the same conditions of use, one strip of the same trimmer line was used in the pivot post 116 of the first embodiment of the present invention and this line did not break at the exit holes 123 or elsewhere. Additionally, the line was easily removed several times during use. This data shows that the new shape of pivot post 116 greatly improves the performance of the Ugly™ head by minimizing or possibly eliminating breakage at the exit holes of the pivot posts when used for cutting very dense vegetation such as tree saplings (volunteers), where the line is apt to wrap around the vegetation.

A variation for the first embodiment pivot post design of the present invention is to alter the slanted surface 132 to be a vertical surface (not shown) such that the pivot post has the same diameter over its entire height, with the exception of the lower flange.

In another variation, the plastic material 124 separating the two through holes could be replaced by a metal shim or insert. It is also within the scope of the invention to utilize a combination of plastic and metal. The novel post 116 is designed to be symmetrical; however, it is possible to deviate from a symmetrical design so long as a constant spacing is maintained between the exit of the straight through holes and the folded inner radius of the trimmer line.

Second Embodiment of the Present Invention

Figure 14:
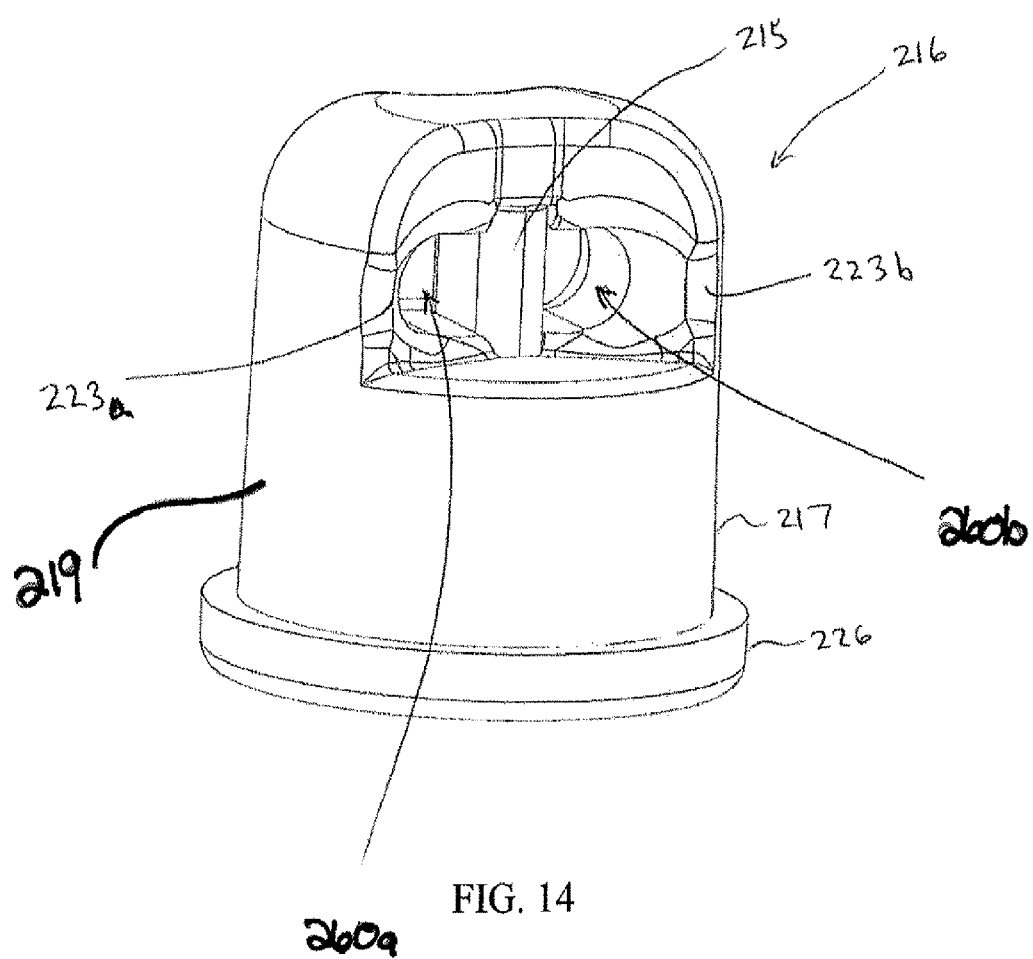
FIG. 14 shows an upper perspective view of a second embodiment of an improved pivot post of the present invention.
Figure 15:
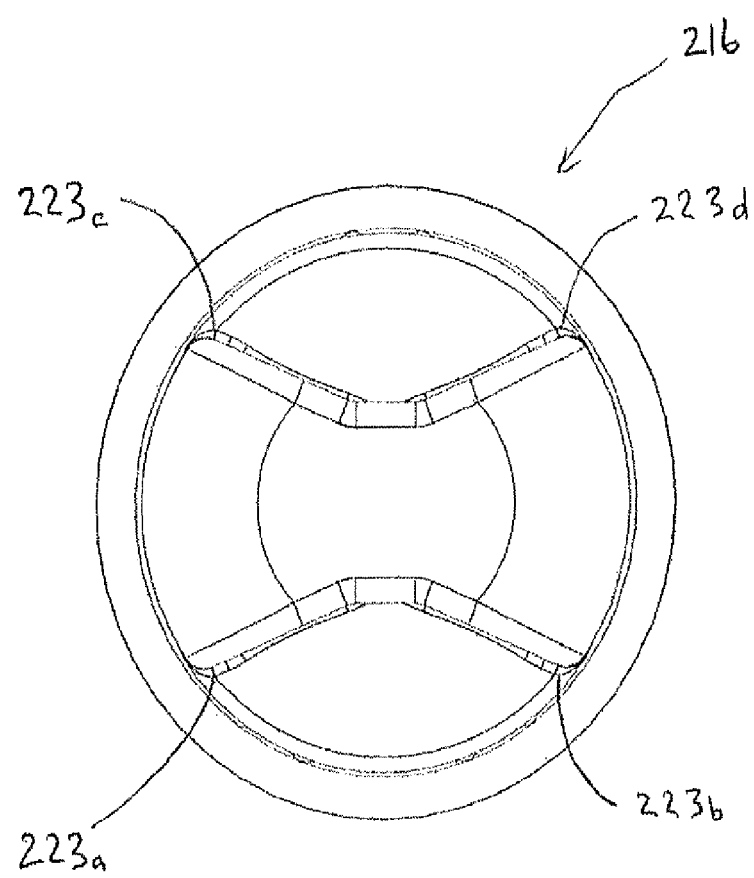
FIG. 15 shows a top view of the pivot post shown in FIG. 14.
Figure 19:
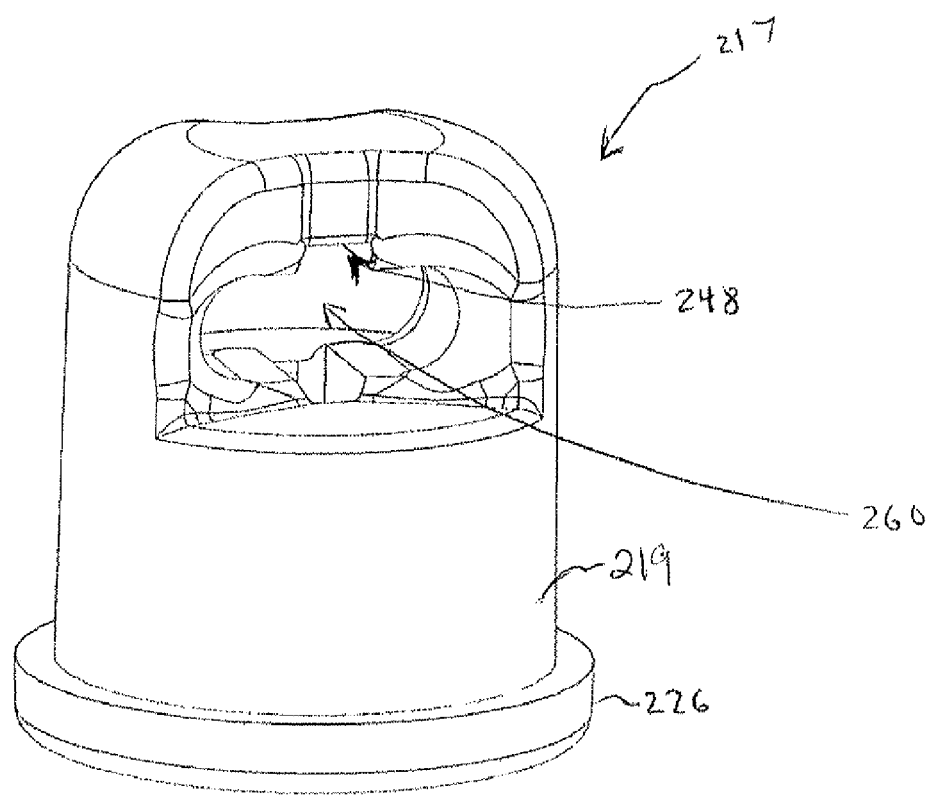
FIG. 19 shows is an upper perspective view of the housing for the pivot post shown in FIG. 14.
Figure 20:
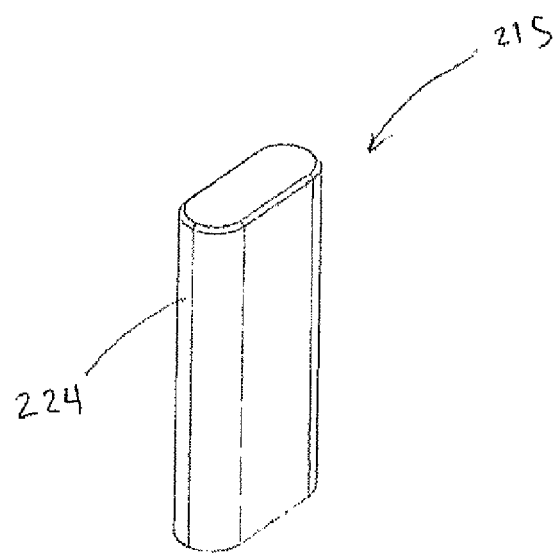
FIG. 20 shows a perspective view of the metal shim removed from the pivot post in FIG. 14.
Figure 21:
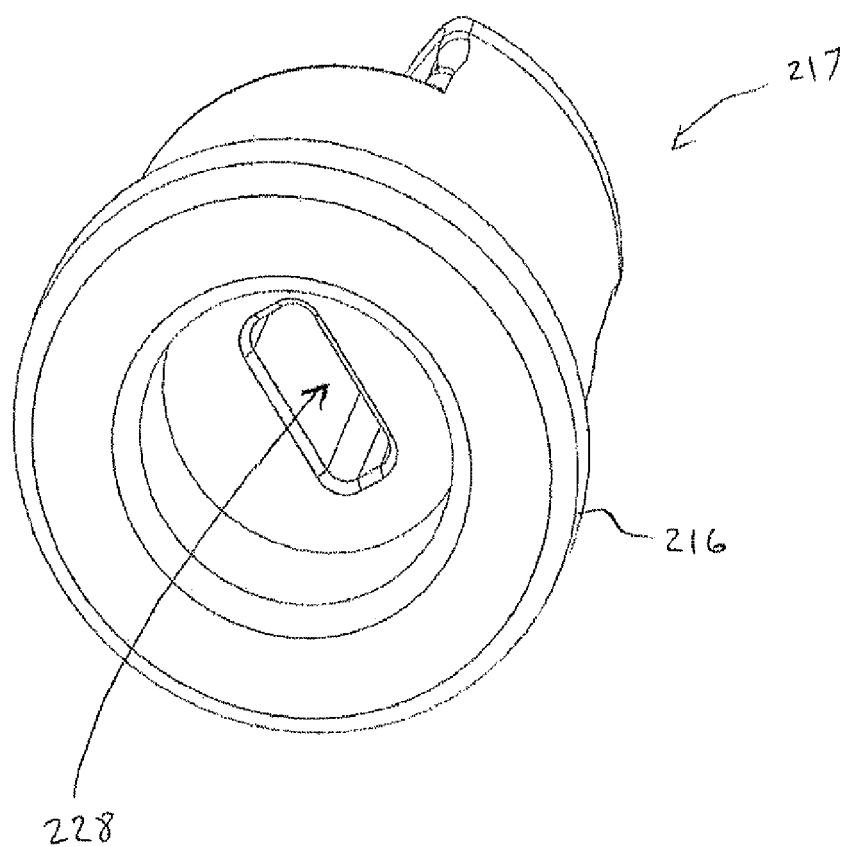
FIG. 21 shows a lower perspective view of the housing for the pivot post shown in FIG. 14.

A second improved pivot post 216 is shown in FIGS. 14-21. The improved pivot post 216 comprises a housing 217 and a metal post 215. The housing is depicted in FIGS. 19 & 21. It comprises a generally cylindrical main housing portion 219 and a lower flange 226. Main housing portion 219 has a single central passageway 260 oriented perpendicular to the axis of rotation of pivot post 216 and extending the entire diameter through as shown in FIG. 19. As shown in the present drawings and embodiment, passageway 260 is horizontally oriented. Metal post 215 extends vertically downward through the center of passageway 260, effectively forming first side 260a of passageway and second side 260b of passageway. First and second sides 260a, 260b support and retain the two separate legs of a folded strip of trimmer line. FIG. 14 depicts the pivot post assembly 216 after metal post 215 is installed in the housing 217.

To facilitate installation of the metal post 215, the housing 217 has a vertically oriented receiving aperture 228 shown in FIG. 21. Receiving aperture 228 is shown in a vertical orientation but would only need to be perpendicular to passageway 260 and in the same orientation as the axis of rotation of pivot post 216. Receiving aperture 228 is accessible from the underside of the housing 217. The metal post 215 is inserted into the receiving aperture until the upper end of the post rests completely in slot 248 located above passageway 260. The lower end of the metal post should be slightly recessed in receiving aperture 228 after insertion and held firmly therein.

Figure 32:
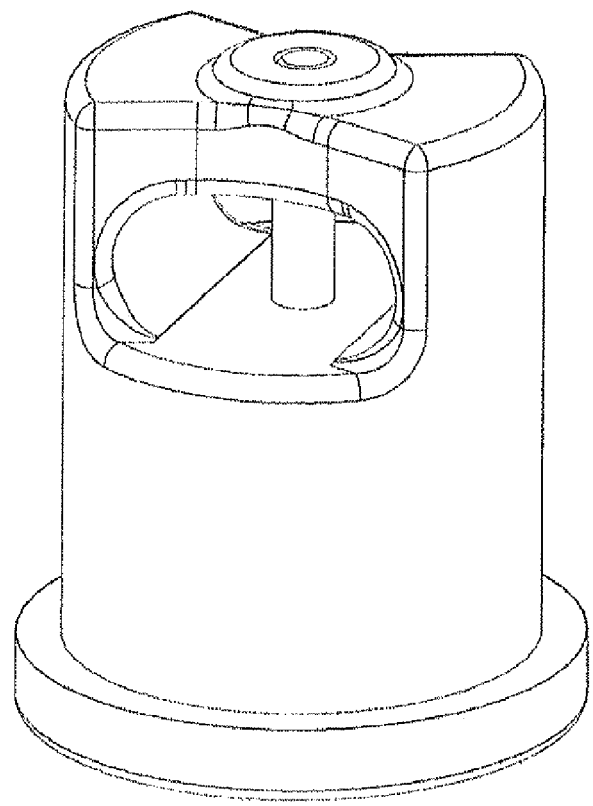
FIG. 32 is a variation on the second embodiment shown in FIG. 14, utilizing a single round pin in the middle of the pivot post.

The cross-sectional shape of the metal post 215 is designed with two flat sides and large radii 224 at the opposite adjoining ends, as shown in FIG. 20. Post, however, could also be oval shaped. Another option would be to use a single round pin, as shown in FIG. 32. The key is to have a somewhat rounded shape for the inner radius 158 of the folded trimmer line to fit around. When a folded piece of trimmer line 132 is inserted into the pivot post 216, the inside radius 158 of the folded line is placed against the smooth radius 224 of the metal post 215. The metal posts 215 can be easily manufactured with a large smooth radius on the outer edges. These larger radii result in less stress on the folded portion of line. In the event that the surface of the nylon trimmer line were to melt, the molten nylon also does not adhere easily to metal and the metal post has the additional advantage of being more abrasion resistant and thus less susceptible to wear.

Figure 16:
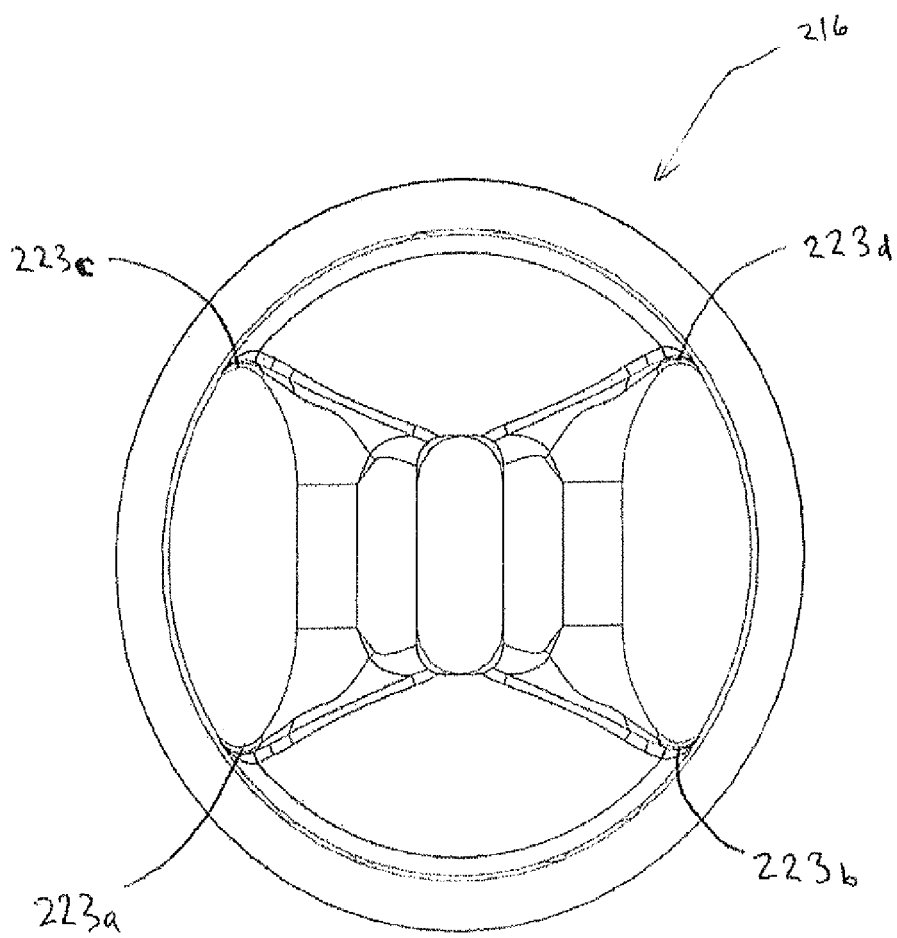
FIG. 16 shows a top view of a cross-sectional slice of the pivot post shown in FIG. 15, the horizontal slice taken through the widest portion of the passageway.
Figure 17:
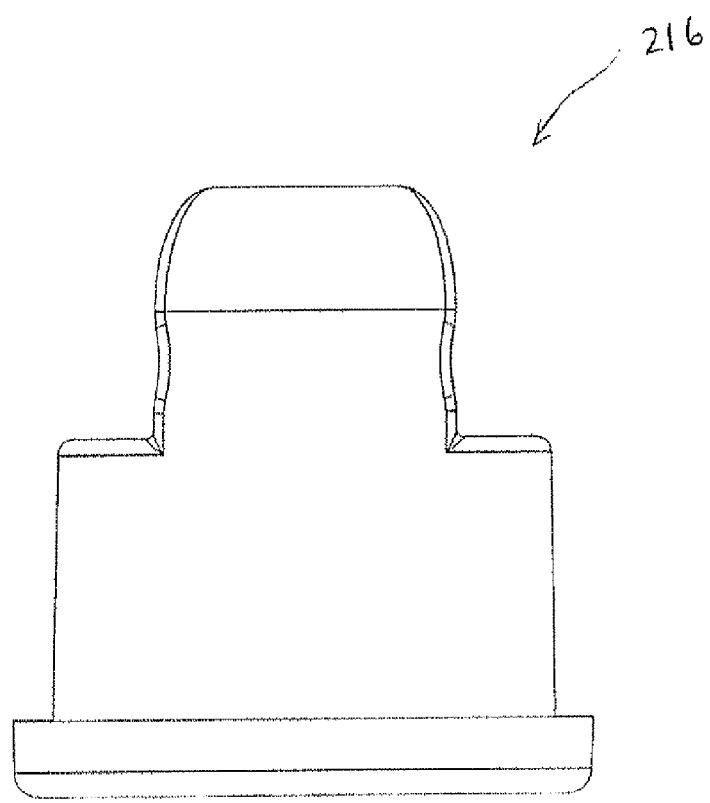
FIG. 17 shows a side view of the pivot post shown in FIG. 14.
Figure 18:
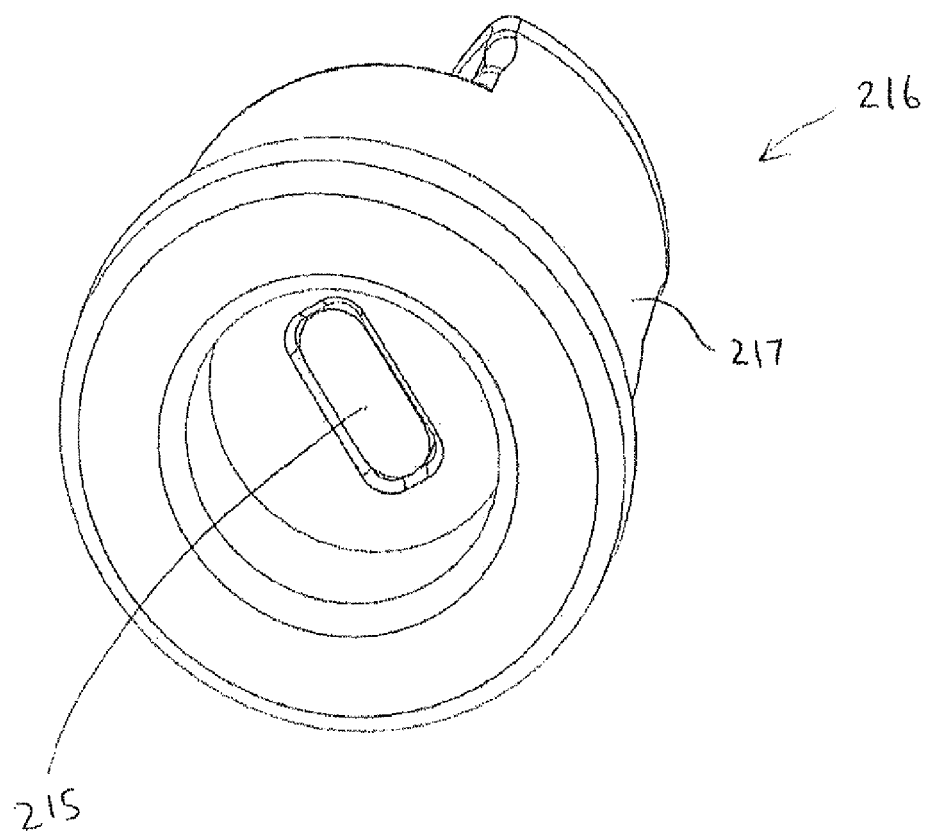
FIG. 18 shows a lower perspective view of the pivot post shown in FIG. 14.

Another advantage of the pivot post assembly 216 is the smooth radii 223a-d located on the outer edges of the sides 260a and 260b, as shown in FIG. 16. As shown in FIG. 16, the smooth radii 223 a-d are located in four positions, all located on the outer edges of the exits to the sides 260a and 260b. As the line is impacted, it sometimes wraps around the sides of the pivot posts. The commercially available pivot posts 16 (prior art) have sharp edges at the exit of the passageways 22a and 22b designed to hold the line. The design of the improved pivot posts 216 of this embodiment allows the trimmer line to be supported as it wraps around the adjacent portions of the post. The support provided by the smooth radii 223 a-d minimizes the stress placed on the trimmer line and reduces the tendency for stress-cracks to form in the line. With the prior art pivot posts, line breakage at the exit of these passageways is sometimes a problem.

Extensive testing with this improved pivot post design 216 has confirmed that line breakage and welding is greatly reduced relative to the commercial post 16 when cutting under similar conditions.

The pivot post assembly 216 is designed to be symmetrical so that the line can be inserted into the central passageway 260 from either side.

The improved pivot post 216 can replace the pivot posts 16 shown in FIG. 1 without modification of the Ugly™ Head. The thickness and diameter of lower flange 226 can be identical to the lower flange 26 on the pivot post 16 of commercially available products. Additionally, the overall heights of the pivot post 16 of the prior art and of the pivot post 216 of this invention can be the same. The invention 216 can be used in any of the existing commercial Shakespeare heads without modification of the heads.

Although the present embodiment is preferably made of an injection molded plastic pivot post with a metal post, it is also within the scope of the present invention to injection mold the entire pivot post, including the post insert 215, entirely from plastic provided the plastic utilized had a high melting point.

Third Embodiment

Figure 22:
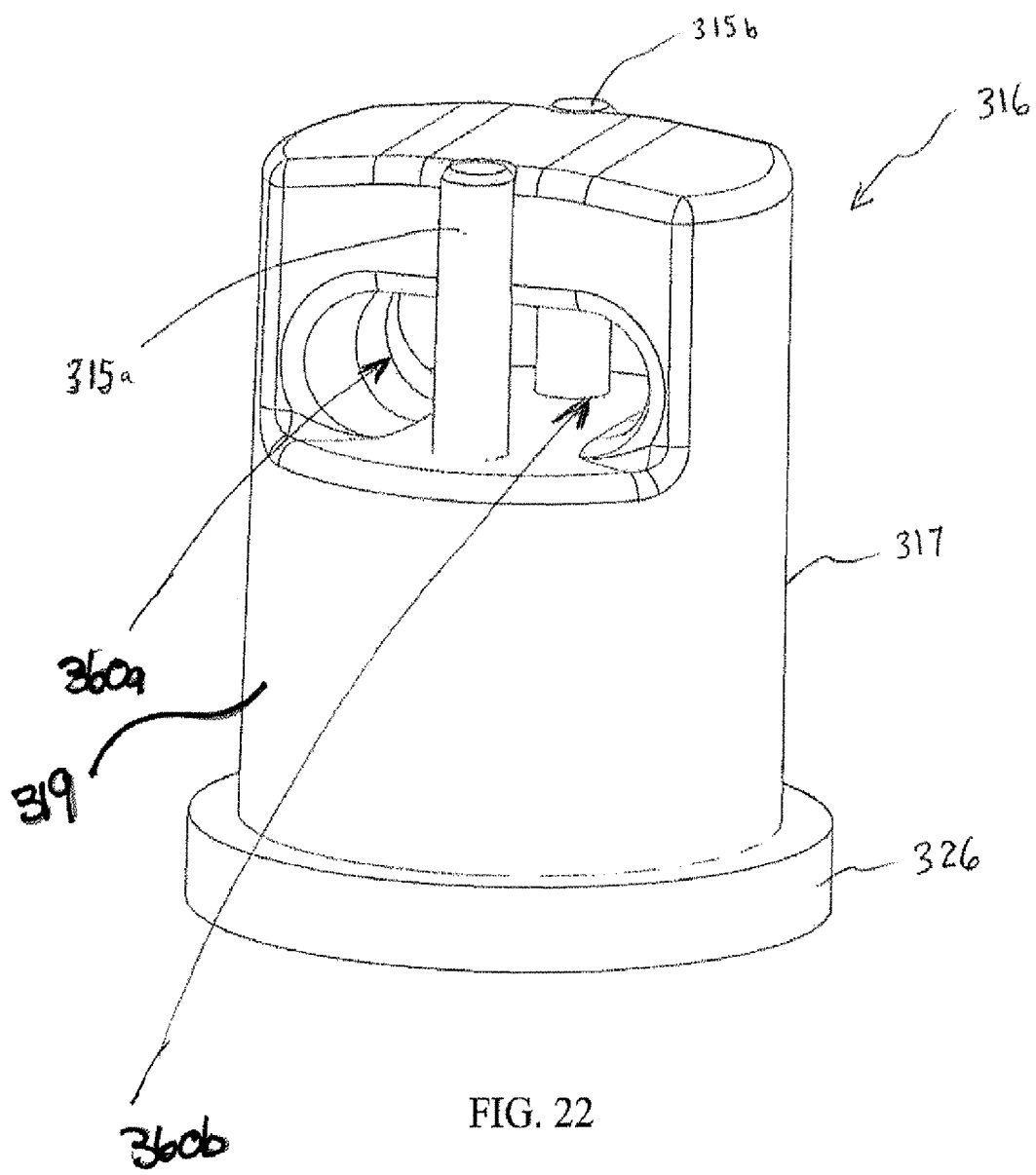
FIG. 22 shows an upper perspective view of a third embodiment of an improved pivot post of the present invention.
Figure 23:
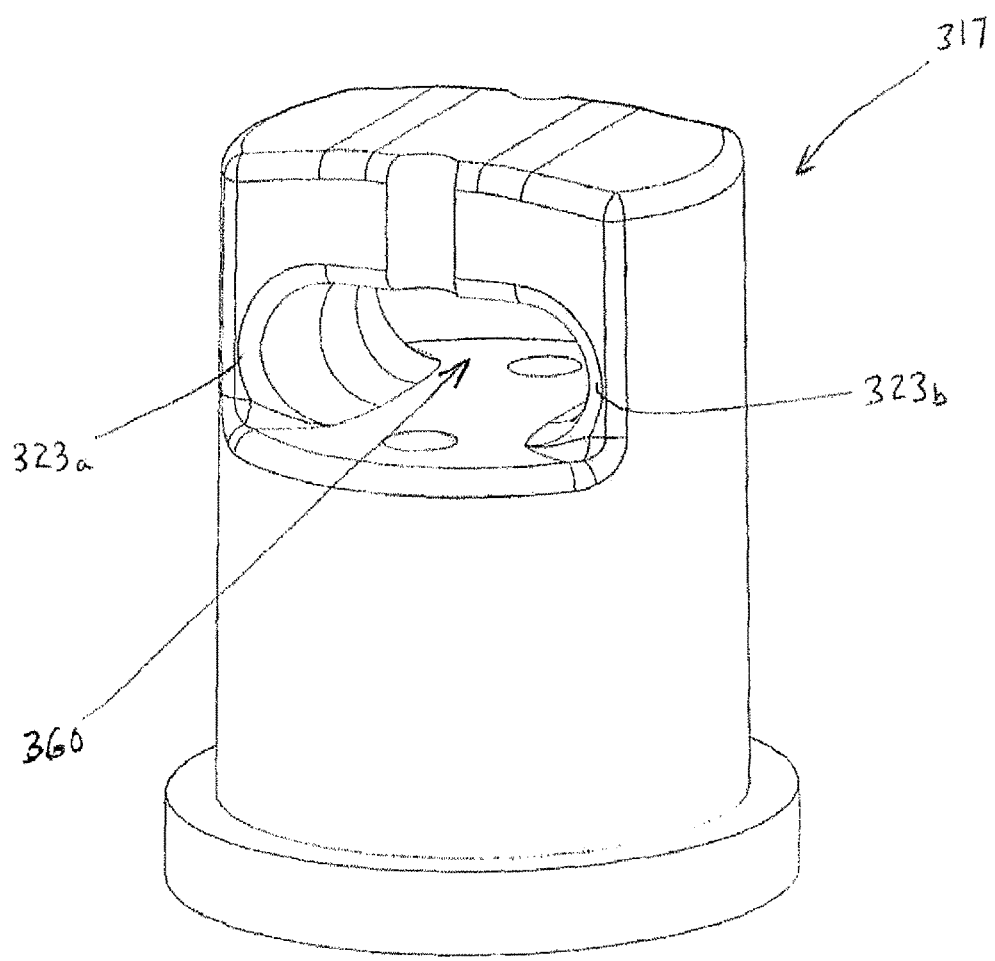
FIG. 23 is an upper perspective view of the housing for the pivot post shown in FIG. 22.
Figure 24:
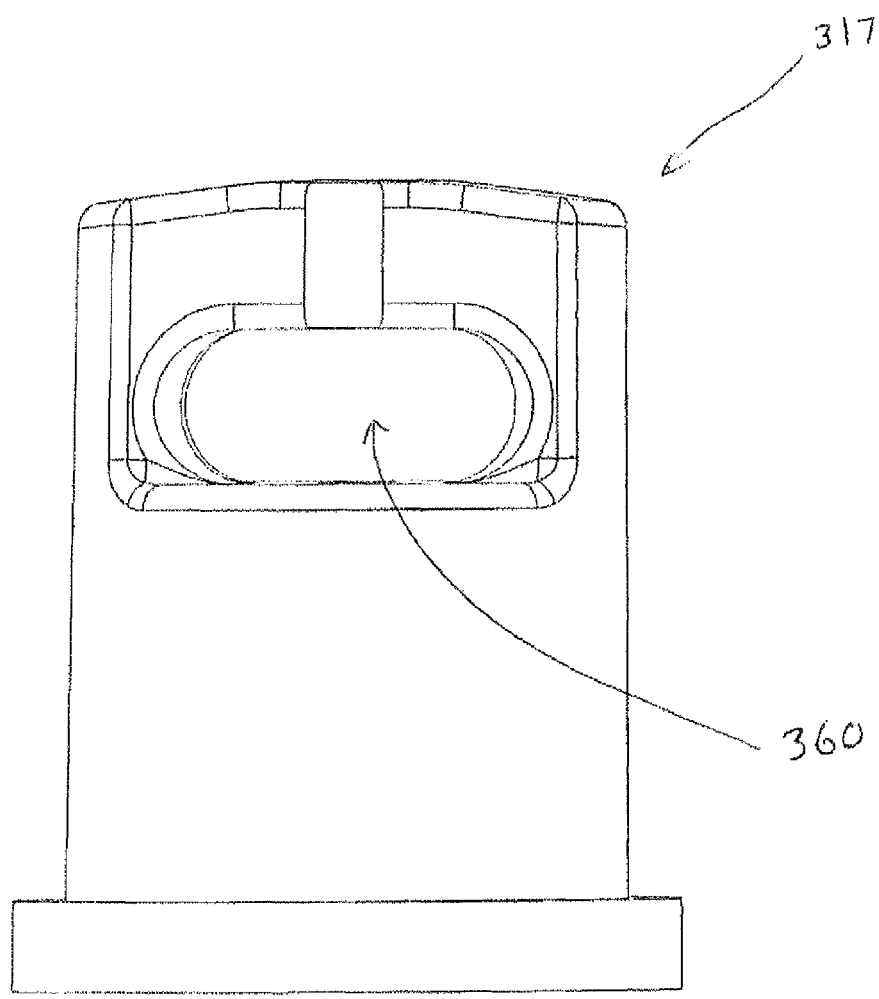
FIG. 24 is a side view of the housing for the pivot post shown in FIG. 22.
Figure 25:
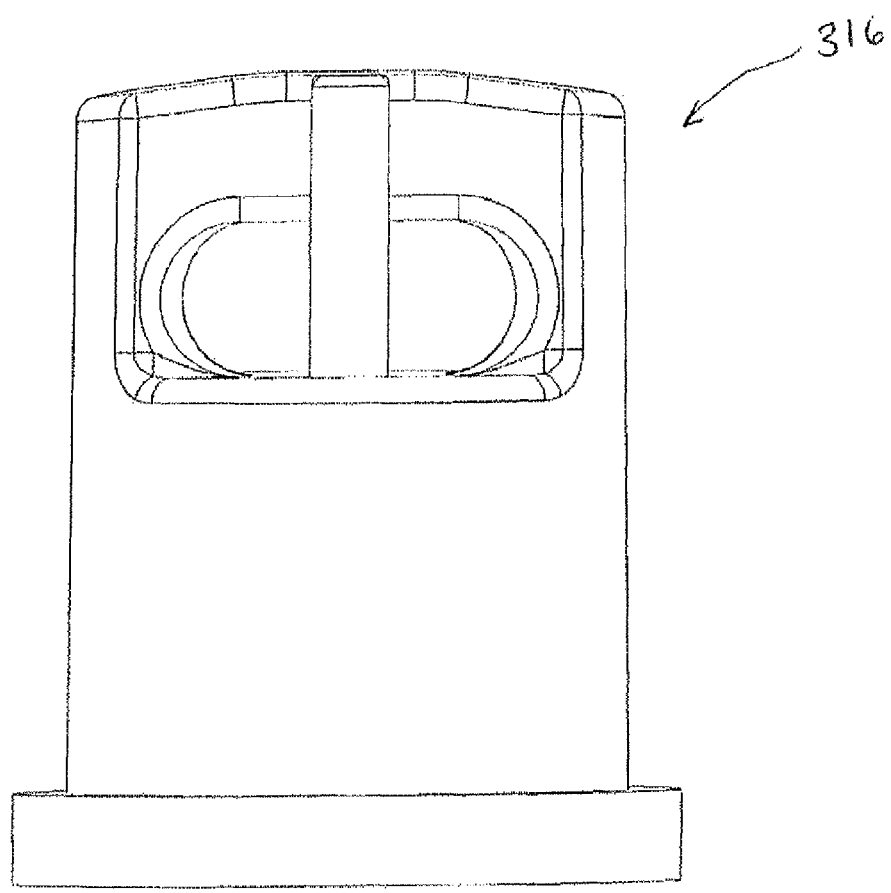
FIG. 25 is a side view of the pivot post shown in FIG. 22.
Figure 26:
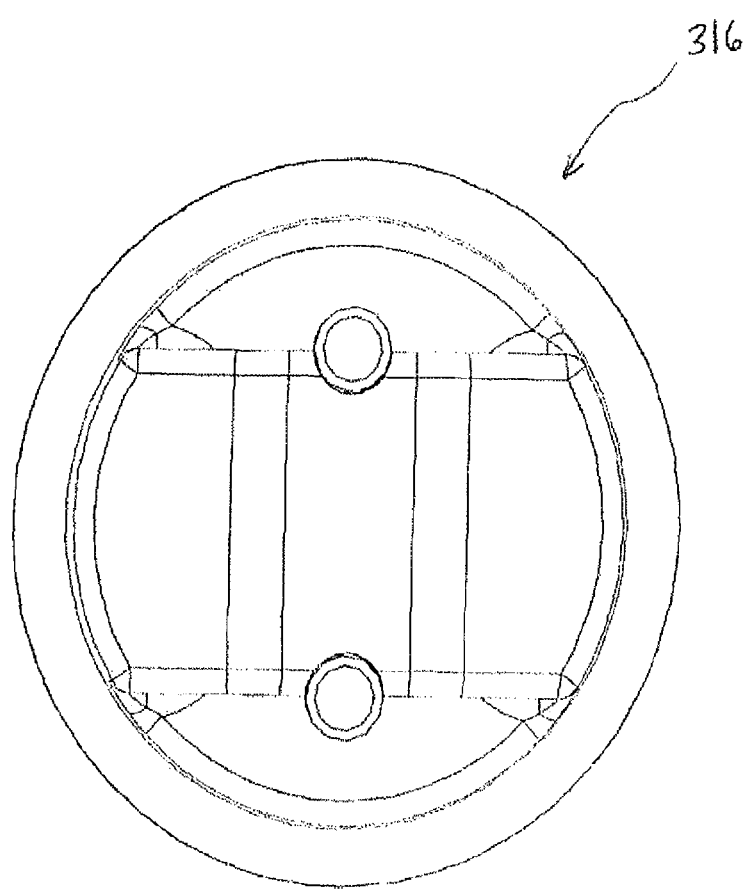
FIG. 26 is a top view of the pivot post shown in FIG. 22.
Figure 27:
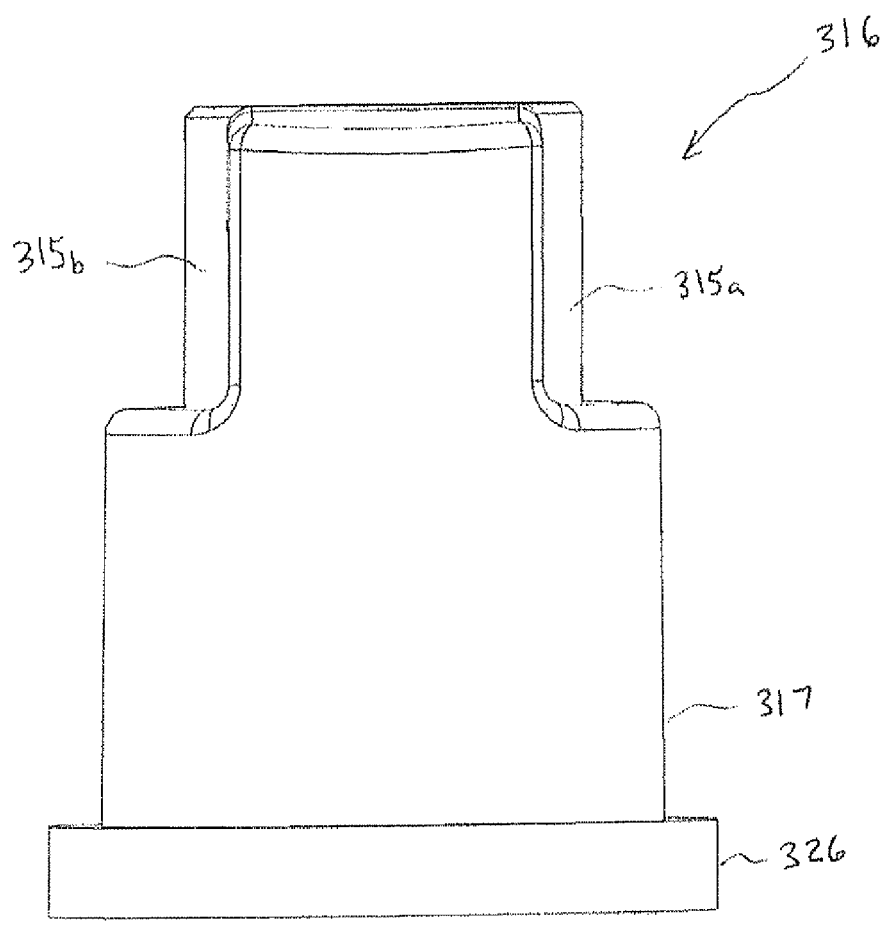
FIG. 27 is an alternate side view of the pivot post shown in FIG. 22, the post rotated 90 degrees relative to FIG. 25.
Figure 28:
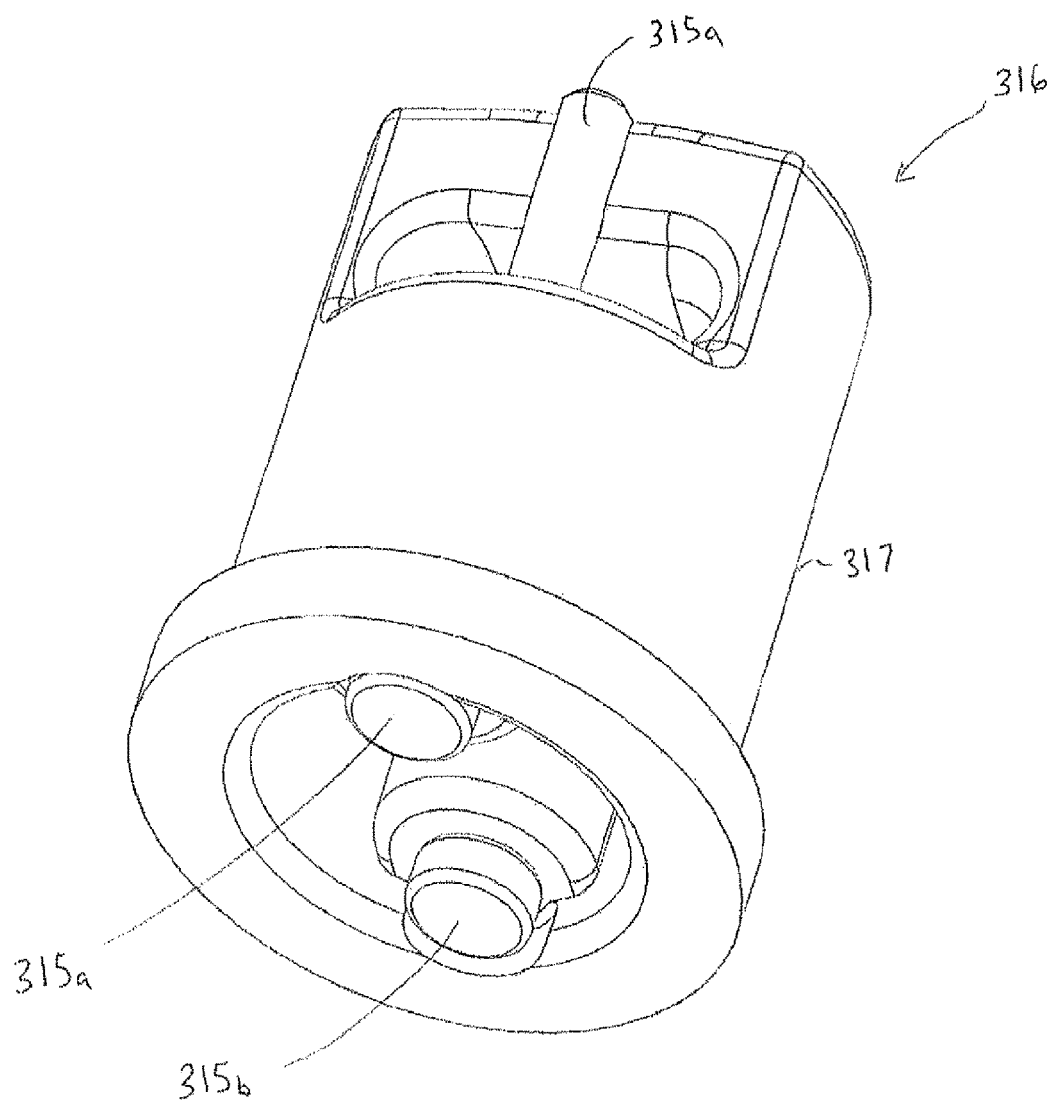
FIG. 28 is a lower perspective view of the pivot post in FIG. 22.
Figure 29:
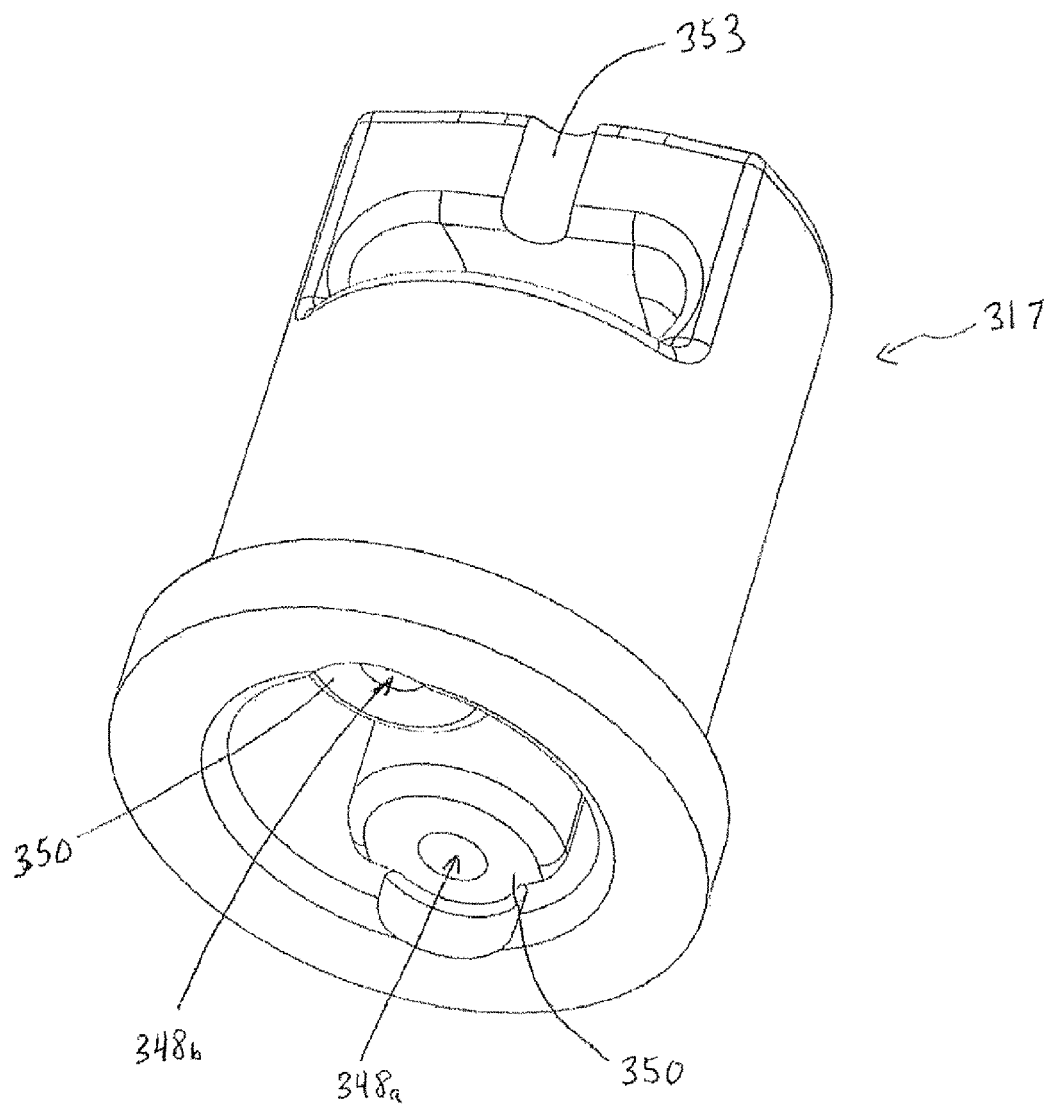
FIG. 29 is a lower perspective view of the housing for the pivot post shown in FIG. 22.
Figure 30:
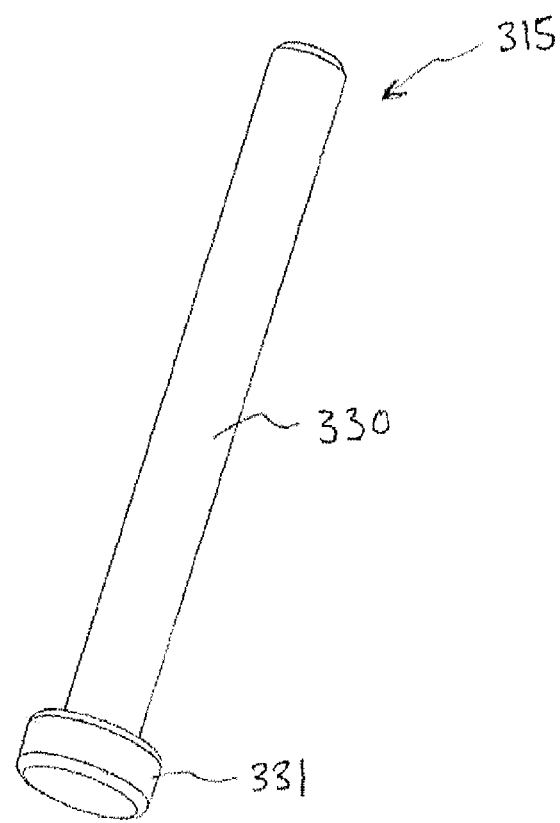
FIG. 30 is a lower perspective view of the metal pin for the pivot post shown in FIG. 22.

A third improved pivot post design 316 is shown in FIGS. 22-31. The improved pivot post 316 comprises housing 317 and first and second metal pins 315a and 315b. The housing is depicted in FIGS. 23, 24 & 29. It has a single central passageway 360 as shown in FIG. 23 extending through the entire diameter of housing. Housing 317 comprises a generally cylindrical main housing portion 319 and lower flange 326. Housing 317 is assembled with first and second metal pins 315a and 315b which are at least partially external to the passageway. Passageway 360 comprises first and second entrances 360a, 360b for receiving the trimmer line ends. FIG. 22 depicts the pivot post assembly 316 with first and second metal pins 315a and 315b installed in the housing 317, which supports and retains a folded strip of trimmer line 132.

Figure 33:
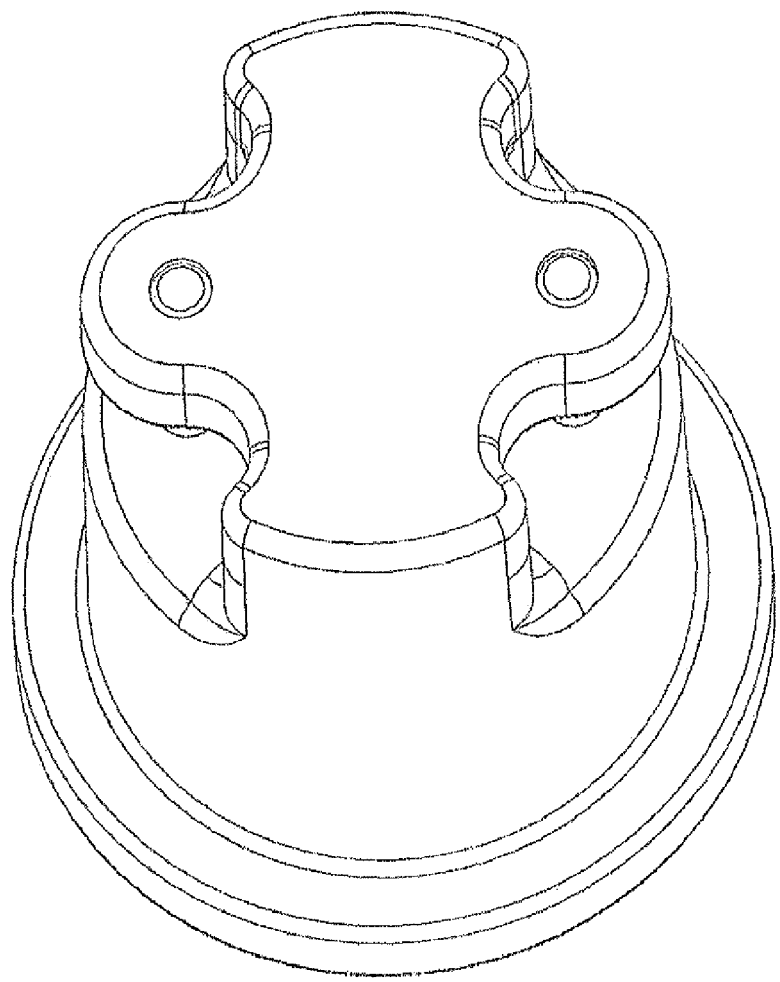
FIG. 33 shows a variation of the pivot post in FIG. 22, where the tops of the pins are constrained within the molding of the housing.

To facilitate installation of the metal pins, the housing 317 has two receiving apertures 348a and 348b shown in FIG. 29. The receiving apertures are accessible from the underside of the housing 317. The metal pins 315 (see FIG. 30) comprise a round shank 330 with a head 331 on one end. The pins 315a and 315b are inserted into receiving apertures 348a and 348b until the head 331 rests against the lower surfaces 350 of receiving apertures (which lower surfaces surround the lower aperture opening) as shown in FIG. 29. The free end of the shank 330 passes upward through receiving apertures and continues through the open space created by passageway 360. The free end of the shank rests against the upper portion 353 (see FIG. 29) of the housing 317, yet the free end is not necessarily locked to this upper portion 353. The upper end of the pins could, however, be restrained in a variation by molded material as shown in FIG. 33. In such case, the shape of the upper surface of pivot post 316 could be as shown in FIG. 33 or could be complimentary to the shape of the lower portion of main housing portion 319.

When a folded piece of trimmer line 132 is inserted into the pivot post 316, the inside radius 158 of the folded line is placed against the shank 330 of one of the metal pins 315. The radius of the metal pins results in less stress on the folded portion of line as it does not comprise a sharp edge. Secondly, in the event that the surface of the nylon trimmer line was to melt, the molten nylon does not adhere easily to metal. The metal pin 315 also has the advantage of being more abrasion resistant and thus less susceptible to wear.

Another advantage of the pivot post assembly 316 is the smooth radii 323a-d located on the outer edges of the vertical portion of the housing 317, as shown in FIG. 23. These large smooth radii 223 a-d are located in four positions, all located on the outer edges of the exits to the line passageway 360. As the trimmer line impacts dense vegetation, it sometimes wraps around the sides of the pivot posts. The design of the improved pivot posts 316 of this embodiment allows the trimmer line to be supported if it wraps around the adjacent portions of the post. The support provided by the smooth radii 223 a-d minimizes the stress placed on the trimmer line and reduces the tendency to form stress-cracks in the line.

Figure 34:
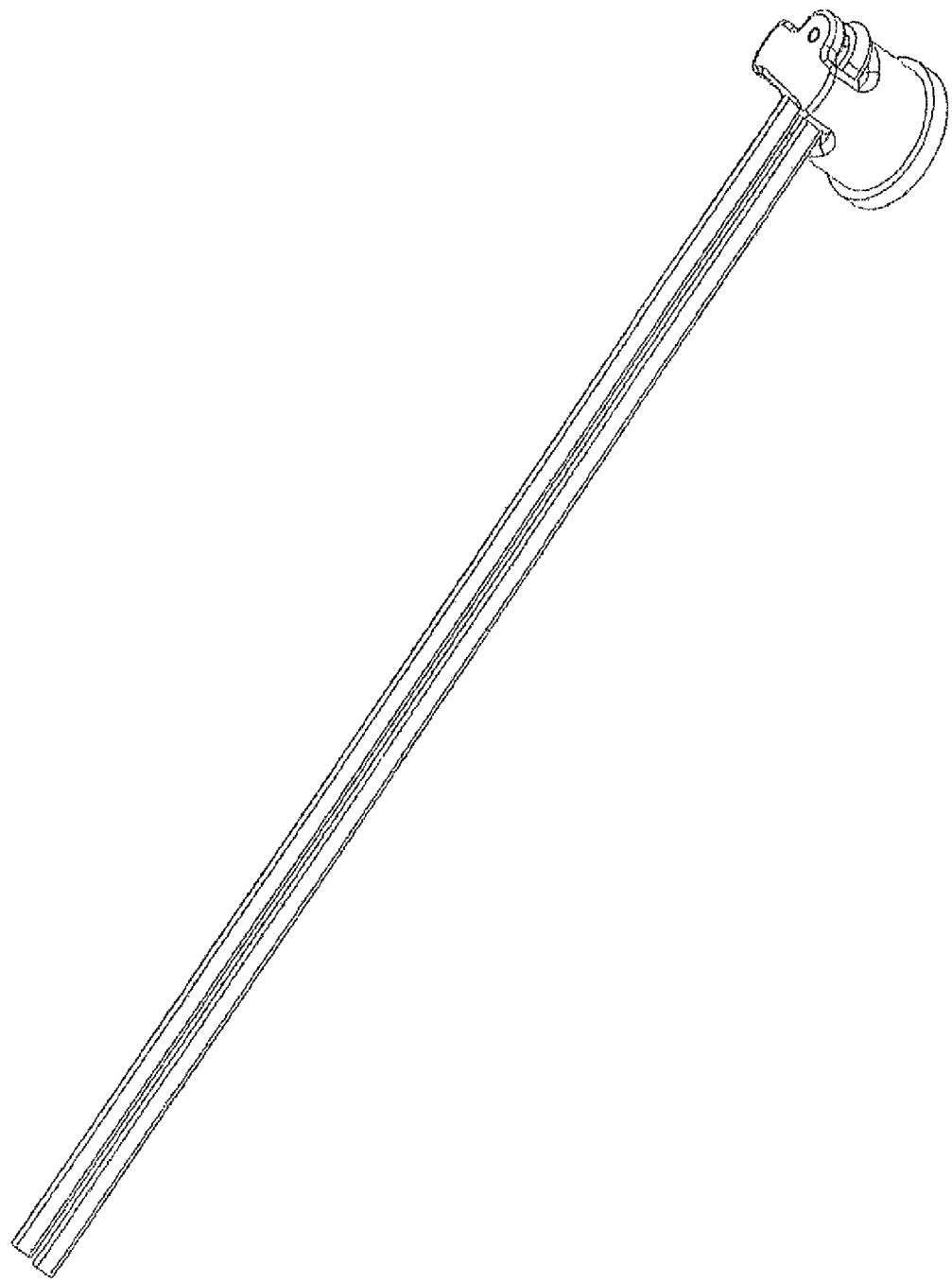
FIG. 34 shows a variation of the pivot post in FIG. 33, where the post is not symmetrical and utilizes one metal pin. The post is shown with line installed.

The pivot post assembly 316 is designed to be symmetrical so that the line can be inserted into the passageways from either side. However, the post could be configured as shown in FIG. 34 as well wherein the pivot post is not symmetrical, but allows for insertion of the trimmer line only from a single side.

Yet another advantage of the novel pivot post 316 is that if the trimmer line is pulled in a sawing motion (as discussed previously), the open single passageway 360 does not have the same geometric constraints associated with the two parallel straight through holes 22a and 22b common to the posts 16 in the commercial products. For example, the passageways 22a and 22b on the commercial products are round and each opening has a diameter of 3.05±0.05 mm. The single passageway 360 in the post 316 has a height of 3.05 mm and a width of 7.4 mm. The added space in the passageway 360 can accept a flared or deformed portion of line without the line becoming lodged in the passageway 360.

The improved pivot post 316 can replace the pivot posts 16 shown in FIG. 1 without modification of the Ugly™ Head trimmer head model. The thickness and diameter of flange 326 can be identical to the flange 26 on the pivot post 16 of the prior art. Additionally, the overall heights of the pivot post 16 and of the novel pivot post 316 of this invention can be the same. The post 316 of the present invention can be used in any of the existing commercial Shakespeare heads, as well as other similar trimmer heads, without modification of the heads.

Figure 31:
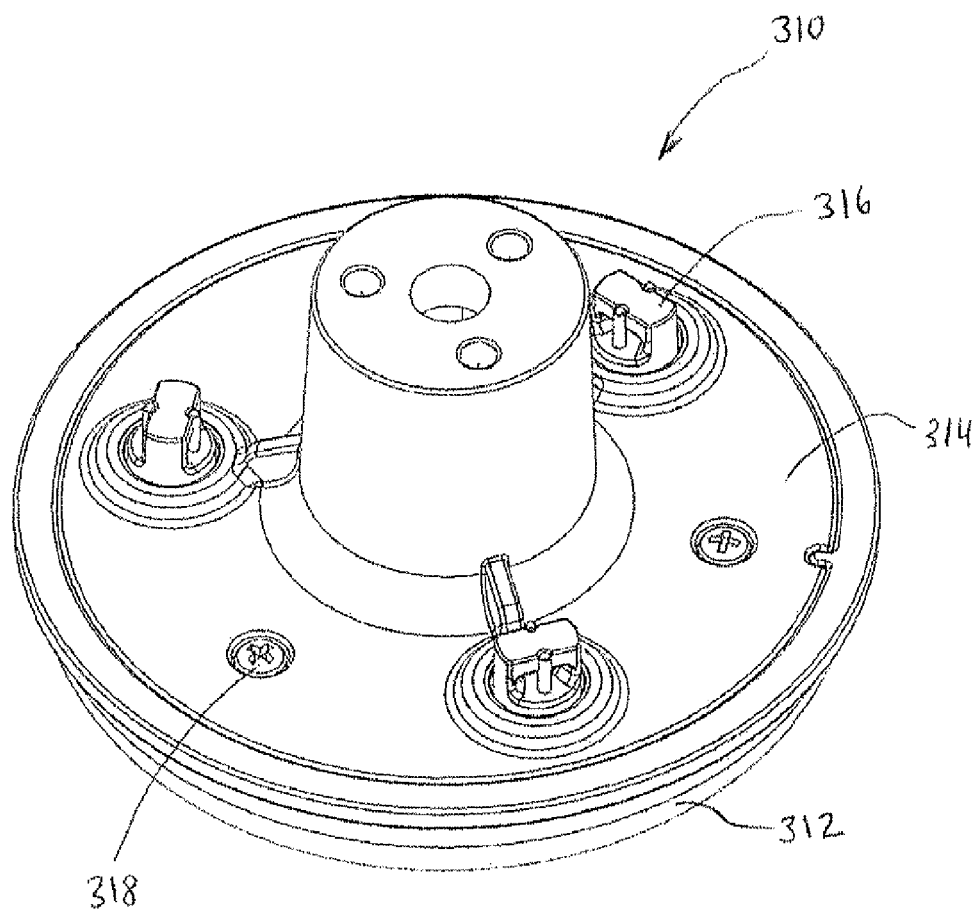
FIG. 31 is a trimmer head incorporating three equally spaced pivot posts shown in FIG. 22.

The improved pivot post 316 is shown assembled in a trimmer head in FIG. 31. The posts are spaced 120 degrees apart. Each post holds one folded strip of trimmer line. Extensive testing with this improved pivot post design 316 has confirmed that line breakage is greatly reduced relative to the commercially available products when cutting under similar conditions.

Trial #6

The performance of two trimmer heads with pivoting posts (Sample A and Sample B) was compared under two sets of conditions. Sample A consisted of a round head with equally spaced post. Sample A had pivot posts of the type shown in FIGS. 3 through 8. Sample B was also round head with equally spaced posts, but was outfitted with pivot posts of the present invention as shown in FIG. 22. The heads were connected one at a time to an Echo SMH-230 model trimmer. The trimmer line had a label size of 95 mils (0.095 inches).

Head Sample A was loaded with a strip of trimmer line in each pivot post. The trimmer was operated and held such that the lines impacted a chain link fence for five minutes. After five minutes, the performance of each strip of line was noted as either i) normal wear, ii) broken-off flush with the line exit on the pivot post, or iii) pulled out of the pivot post. This test was repeated ten times and the results averaged. Sample B was tested in the same manner. The results are as follows:

Head Sample A: 2.5% of the line strips pulled out, and 97.5% of the line strips had normal wear.
Head Sample B: 100% of the line strips had normal wear.

Trial #7

Using the same head samples and trimmer machine as Trial #6, the test was conducted utilizing small volunteers (two to three foot tall tree saplings) in place of the chain link fence. Again, the testing was repeated ten times for each head, each time replacing the line with fresh strips of trimmer line. The results were as follows:

Head Sample A: 30% of the line strips broke flush with the pivot post, 30% of the line strips pulled out, and 40% of the strips had normal wear.

Head sample B: 10% of the line strips broke flush with the pivot posts, and 90% of the line strips had normal wear. For Head Sample B, the line was always easy to remove from the novel pivot posts after each test.

The above data confirms that the new pivot post design 316 is greatly improved over the commercially used pivot posts 16 when cutting volunteers.

In all of the above embodiments, the post pivots about its vertical axis. The center of gravity (CG) of the pivot posts would preferably be aligned with the axis of rotation. Obviously, if the post is not symmetrical as with some of the embodiments disclosed herein, then the CG would not be aligned with the axis of rotation.

Although the use of two metal pins 315a and 315b are shown herein, it is also within the scope of the present invention for pivot post 316 to comprise as few as a single metal pin either centrally located (FIG. 32) or asymmetrically located (FIG. 34). It is also within the scope of the present invention for pivot post 316 to comprise a series of three or more spaced apart metal pins located in the center of the open passageway 360 (not shown).

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined by the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e. meaning "including, but not limited to") unless otherwise noted. The term "connected" is to be construed as partly or wholly contained within, attached to or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A pivoting line holder for a trimmer head capable of retaining a folded length of trimmer line, the line holder comprising a housing having a generally cylindrical base to engage and be retained by a complimentary bearing sleeve, a lower flange extending radially outward from the lower periphery of said cylindrical base for retaining said line holder within said housing, a single open passageway extending horizontally end to end through said housing, and a series of at least two metal pins extending vertically upward through the center of said open passageway, the two end pins in the series of at least two metal pins located at least partially external to said open passageway, the majority of said open passageway remaining free of obstruction.

2. The pivoting line holder of claim 1, said pivoting line holder being operatively attachable to a trimmer head for a rotary trimming device.

* * * * *